US011912435B2

(12) United States Patent
Abramov et al.

(10) Patent No.: US 11,912,435 B2
(45) Date of Patent: Feb. 27, 2024

(54) AIR VEHICLE SYSTEM

(71) Applicant: ISRAEL AEROSPACE INDUSTRIES LTD., Lod (IL)

(72) Inventors: Danny Abramov, Shoham (IL); Artem Korobkov, Ganei Tikva (IL); Ron Bublitsky, Haifa (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 72 days.

(21) Appl. No.: 17/623,492

(22) PCT Filed: Jul. 6, 2020

(86) PCT No.: PCT/IL2020/050755
§ 371 (c)(1),
(2) Date: Dec. 28, 2021

(87) PCT Pub. No.: WO2021/005595
PCT Pub. Date: Jan. 14, 2021

(65) Prior Publication Data
US 2022/0355932 A1 Nov. 10, 2022

(30) Foreign Application Priority Data
Jul. 10, 2019 (IL) .......................................... 267971

(51) Int. Cl.
*B64C 37/02* (2006.01)
*B64C 39/02* (2023.01)
(Continued)

(52) U.S. Cl.
CPC ................ *B64D 5/00* (2013.01); *B64C 37/02* (2013.01); *B64C 39/024* (2013.01); *B64C 39/08* (2013.01);
(Continued)

(58) Field of Classification Search
CPC .......... B64U 30/10; B64U 10/25; B64D 5/00; B64D 3/00; B64C 39/08; B64C 39/12; B64C 27/02; B64C 2211/00
See application file for complete search history.

(56) References Cited

U.S. PATENT DOCUMENTS 8,123,160 B2 * 2/2012 Shepshelovich ..... B64D 15/163
244/45 R
8,740,134 B2 * 6/2014 Suzuki ................... G05D 1/104
244/75.1
(Continued)

FOREIGN PATENT DOCUMENTS

CN 106275402 A 1/2017
CN 104875885 B 7/2017
(Continued)

OTHER PUBLICATIONS

Kumar, et al., "An Experimental Investigation on the Wake Flow Characteristics of Tandem Flapping Wings", 6th AIAA Theoretical Fluid Mechanics Conference, Jun. 2011, 17 pages.
(Continued)

*Primary Examiner* — Tye William Abell
(74) *Attorney, Agent, or Firm* — Dorsey & Whitney LLP

(57) ABSTRACT

There is provided a composite air vehicle system including: a first air vehicle capable of independent aerodynamic flight; a second air vehicle capable of independent aerodynamic flight; and at least one connector element configured for reversibly interconnecting the first air vehicle and the second air vehicle in tandem arrangement to provide a composite air vehicle capable of aerodynamic flight. The composite air vehicle system is configured for enabling at least in-flight separation of composite air vehicle into the first air vehicle and second air vehicle, and for enabling each one of the first air vehicle and said second air vehicle to operate independently of one another.

24 Claims, 8 Drawing Sheets

(51) Int. Cl.
*B64C 39/08* (2006.01)
*B64C 39/12* (2006.01)
*B64D 3/00* (2006.01)
*B64D 5/00* (2006.01)
*B64U 10/25* (2023.01)
*B64U 30/10* (2023.01)

(52) U.S. Cl.
CPC ............... *B64C 39/12* (2013.01); *B64D 3/00* (2013.01); *B64C 2211/00* (2013.01); *B64U 10/25* (2023.01); *B64U 30/10* (2023.01)

(56) References Cited

U.S. PATENT DOCUMENTS

| | | | | |
|---|---|---|---|---|
| 10,196,143 | B2* | 2/2019 | Quinlan | B64U 70/20 |
| 2007/0102565 | A1* | 5/2007 | Speer | B64D 5/00 |
| | | | | 244/2 |
| 2009/0294573 | A1* | 12/2009 | Wilson | B64C 39/024 |
| | | | | 703/7 |
| 2010/0193625 | A1* | 8/2010 | Sommer | B64C 39/024 |
| | | | | 244/2 |
| 2014/0158812 | A1* | 6/2014 | Luther | B64C 39/10 |
| | | | | 244/2 |
| 2018/0118336 | A1* | 5/2018 | Drennan | B64C 37/02 |

FOREIGN PATENT DOCUMENTS

| | | |
|---|---|---|
| CN | 106915440 A | 7/2017 |
| CN | 107571992 A | 1/2018 |
| DE | 102008045972 A1 | 10/2009 |
| EP | 3015941 A1 | 5/2016 |
| WO | 2008085536 A2 | 7/2008 |
| WO | 2018144544 A1 | 8/2018 |

OTHER PUBLICATIONS

Lian, et al., "The Characterization of Tandem and Corrugated Wings", Progress in Aerospace Sciences, 2013, 29 pages.

Wolkovitch, "Subsonic VSTOL Aircraft Configurations with Tandem Wings", Sep. 1979, pp. 605-611.

Montalvo, Carlos Jose, "Meta Aircraft Flight Dynamics and Controls", A Dissertation Presented to The Academic Faculty, Georgia Institute of Technology, May 2014, 161 pgs.

Wikipedia, "Space Shuttle", retrieved from https://en.wikipedia.org/wiki/Space_Shuttle on Dec. 28, 2021; last edited Dec. 27, 2021, 25 pgs.

* cited by examiner

AIR VEHICLE SYSTEM

TECHNOLOGICAL FIELD

The presently disclosed subject matter relates to air vehicles in general, and to modular air vehicles in particular.

BACKGROUND

Individual unmanned aerial vehicles (UAV's) have been in use for many years and perform a great variety of missions. In general, specific UAV's are configured to deliver a specific performance, such as range, endurance, maximum altitude, and so on.

By way of general background, for example, WO 2018/144544 discloses a daisy-chain aerial vehicle including at least two component aerial vehicles. Each component aerial vehicle includes at least one wing having a wing body, a trailing edge, and a wingtip, the wing body shaped like an airfoil. At least one cross-flow fan propulsor is located at the trailing edge, and at least one connection element on the wing is configured to connect and disconnect the aerial vehicles during flight.

GENERAL DESCRIPTION

According to a first aspect of the presently disclosed subject matter there is provided a composite air vehicle system comprising:
- a first air vehicle capable of independent aerodynamic flight;
- a second air vehicle capable of independent aerodynamic flight;
- at least one connector element configured for reversibly interconnecting the first air vehicle and the second air vehicle in tandem arrangement to provide a composite air vehicle capable of aerodynamic flight;
- the composite air vehicle system being configured for enabling at least in-flight separation of composite air vehicle into said first air vehicle and second air vehicle, and for enabling each one of said first air vehicle and said second air vehicle to operate independently of one another.

For example, each one of said first air vehicle and said second air vehicle is configured as an unmanned air vehicle (UAV).

Additionally or alternatively, for example, the first air vehicle and the second air vehicle are substantially similar or identical to one another in size and in aerodynamic configuration.

Additionally or alternatively, for example, the first air vehicle and the second air vehicle each has a flying wing aerodynamic configuration.

Additionally or alternatively, for example, the first air vehicle and the second air vehicle each has a tail-less aerodynamic configuration.

Additionally or alternatively, for example, each one of first air vehicle and the second air vehicle comprises a fuselage and a pair of fixed wings affixed to said fuselage, wherein said wings are configured for selectively providing control moments in each one of at least pitch and roll to the respective one of said first air vehicle and said second air vehicle. For example, each one of the first air vehicle and the second air vehicle further comprises canards.

Additionally or alternatively, for example, each one of first air vehicle and the second air vehicle comprises a propulsion system configured for enabling the respective said first air vehicle or said second air vehicle to be independently operated under powered flight. For example, said propulsion system comprises a powered rotary drive coupled to at least one propeller. For example, said at least one propeller is at least one of: at least one puller propeller; at least one pusher propeller. Additionally or alternatively, for example, said powered rotary drive includes at least one electric motor for providing torque to the propeller; alternatively, for example, said powered rotary drive includes at least one fuel powered combustion engine for providing torque to the propeller.

Additionally or alternatively, for example, each one of first air vehicle and the second air vehicle respectively comprises a first controller and a second controller for controlling at least in-flight operation of the respective said first air vehicle or said second air vehicle. For example, said composite air vehicle said first controller is operatively coupled to said second controller, and wherein said first controller is configured as a master controller and said second controller is configured as a slave controller.

Additionally or alternatively, for example, the connector element is configured for interconnecting the first air vehicle and the second air vehicle in a tandem arrangement such that said second air vehicle is positioned aft spaced with respect to the first air vehicle. For example, the connector element is further configured for interconnecting the first air vehicle and the second air vehicle in said tandem arrangement such that said second air vehicle is also positioned upwardly spaced with respect to the first air vehicle. For example, the connector element is further configured for interconnecting the first air vehicle and the second air vehicle in said tandem arrangement such that said first air vehicle is also positioned upwardly spaced with respect to the second air vehicle. Additionally or alternatively, for example, said connector element comprises a connector strut having a first end and a second end spaced from one another, the first end being configured for reversibly affixing to the first air vehicle and the second end being configured for reversibly affixing to the second air vehicle. For example, the first end is configured for being reversibly affixed with respect to an upper part of the first air vehicle and wherein the second end is configured for being reversibly affixed with respect to a lower part of the second air vehicle. Additionally or alternatively, for example, the first end comprises a first connection arrangement configured for being reversibly affixed with respect to an upper part of the first air vehicle and wherein the second end comprises a second connection arrangement configured for being reversibly affixed with respect to a lower part of the second air vehicle. For example, the first end comprises a first edge, and the first connection arrangement comprises a plurality of outwardly projecting first brackets configured for reversibly affixing the connector element to an upper fuselage surface of the first air vehicle. Additionally or alternatively, for example, the second end comprises a second edge, and the second connection arrangement comprises a plurality of outwardly projecting second brackets configured for reversibly affixing the connector element to a lower fuselage surface of the second air vehicle.

Additionally or alternatively, for example, the connector element is in the form of an aerodynamically contoured spacer body. For example, the connector element is in the form of an aerodynamic vertical fin, having an aerofoil-like cross-section, a leading edge and a trailing edge. Additionally or alternatively, for example, the connector element has a swept-back aerodynamic configuration, which facilitates providing a desired required longitudinal spacing and height spacing between the first air vehicle and the second air vehicle in the composite air vehicle.

According to a second aspect of the presently disclosed subject matter there is provided a composite air vehicle comprising a first air vehicle, a second air vehicle and a connector, wherein said first air vehicle, said second air vehicle and said connector element are provided by a composite air vehicle system as defined herein regarding the first aspect of the presently disclosed subject matter, and wherein in the composite air vehicle the first air vehicle and the second air vehicle are interconnected together in said tandem arrangement via said connector element.

According to a third aspect of the presently disclosed subject matter there is provided a connector element for a composite air vehicle system, the connector element configured for reversibly interconnecting in tandem arrangement a first air vehicle and a second air vehicle to provide a composite air vehicle capable of aerodynamic flight, the connector element being configured for enabling at least in-flight separation of the composite air vehicle into the first air vehicle and the second air vehicle, to thereby enable each one of the first air vehicle and the second air vehicle to operate independently of one another.

For example, the connector element is configured for interconnecting the first air vehicle and the second air vehicle in a tandem arrangement such that said second air vehicle is positioned aft spaced with respect to the first air vehicle. For example, the connector element is further configured for interconnecting the first air vehicle and the second air vehicle in said tandem arrangement such that said second air vehicle is also positioned upwardly spaced with respect to the first air vehicle. For example, the connector element is further configured for interconnecting the first air vehicle and the second air vehicle in said tandem arrangement such that said first air vehicle is also positioned upwardly spaced with respect to the second air vehicle.

Additionally or alternatively, for example, said connector element comprises a connector strut having a first end and a second end spaced from one another, the first end being configured for reversibly affixing to the first air vehicle and the second end being configured for reversibly affixing to the second air vehicle. For example, the first end is configured for being reversibly affixed with respect to an upper part of the first air vehicle and wherein the second end is configured for being reversibly affixed with respect to a lower part of the second air vehicle. Additionally or alternatively, for example, the first end comprises a first connection arrangement configured for being reversibly affixed with respect to an upper part of the first air vehicle and wherein the second end comprises a second connection arrangement configured for being reversibly affixed with respect to a lower part of the second air vehicle. For example, the first end comprises a first edge, and the first connection arrangement comprises a plurality of outwardly projecting first brackets configured for reversibly affixing the connector element to an upper fuselage surface of the first air vehicle. Additionally or alternatively, for example, the second end comprises a second edge, and the second connection arrangement comprises a plurality of outwardly projecting second brackets configured for reversibly affixing the connector element to a lower fuselage surface of the second air vehicle.

Additionally or alternatively, for example, the connector element is in the form of an aerodynamically contoured spacer body. For example, the connector element is in the form of an aerodynamic vertical fin, having an aerofoil-like cross-section, a leading edge and a trailing edge. Additionally or alternatively, for example, the connector element has a swept-back aerodynamic configuration, which facilitates providing a desired required longitudinal spacing and height spacing between the first air vehicle and the second air vehicle in the composite air vehicle.

According to a third aspect of the presently disclosed subject matter there is provided a method of providing a composite air vehicle system, the method comprising:
  providing a composite air vehicle system, the composite air vehicle system being as defined herein regarding the first aspect of the presently disclosed subject matter;
  interconnecting the first air vehicle with the second air vehicle in tandem arrangement via the connector element to provide the composite air vehicle.

According to a fifth aspect of the presently disclosed subject matter there is provided a method of operating a composite air vehicle system, the composite air vehicle system being as defined herein regarding the first aspect of the presently disclosed subject matter, the method comprising:
  (a) providing a composite air vehicle, assembled from the composite air vehicle system, the composite air vehicle comprising one said first air vehicle interconnected to one said second air vehicle via a said connector element;
  (b) operating the composite air vehicle to carry out a mission having mission parameters.

For example, the method further comprises the step of disengaging the first air vehicle with respect to the second air vehicle, and operating each one of said first air vehicle and said second air vehicle independently from one another. For example, after said disengagement said connector element remains connected to only one of said first air vehicle and said second air vehicle.

Additionally or alternatively, for example, prior to step (a) said mission parameters are compared with performance characteristics of said first air vehicle and with performance characteristics of said second air vehicle.

For example, if it is determined that said mission parameters can be accomplished using a single one of said first air vehicle and said second air vehicle, then steps (a) and (b) are replaced with the step of preparing and dispatching the respective one of said first air vehicle and said second air vehicle for the mission.

Alternatively, for example if it is determined that said mission parameters cannot be accomplished using a single one of said first air vehicle and said second air vehicle, then said mission parameters are compared with performance characteristics of a composite air vehicle assembled from said first air vehicle and said second air vehicle. For example, if it is determined that said mission parameters can be accomplished using said composite air vehicle, then the method proceeds with steps (a) and (b)

A feature of at least some examples of the presently disclosed subject matter is that a composite air vehicle is provided from a plurality of air vehicles including at least two air vehicles, in particular by interconnecting the plurality of air vehicles (in particular by interconnecting two such air vehicles), wherein each of the air vehicles is configured for independent aerodynamic flight, and wherein the composite vehicle is also configured for aerodynamic flight as a single aerodynamic entity.

Another feature of at least some examples of the presently disclosed subject matter is that a composite air vehicle is provided from two air vehicles, wherein each of the two air vehicles is configured as a first type of aerodynamic vehicle, and wherein the composite vehicle is also configured as a second type of aerodynamic vehicle, different from the aforesaid first type of aerodynamic vehicle. For example, each of the two air vehicles is configured as a flying wing type of aerodynamic vehicle, whereas the composite vehicle is configured as a tandem wing type of aerodynamic vehicle.

Another feature of at least some examples of the presently disclosed subject matter is that a composite air vehicle is provided from two air vehicles, wherein the two air vehicles are essentially similar or identical to one another, and enables any two such air vehicles from a plurality of such air vehicles to be chosen for assembly into the respective composite air vehicle.

Another feature of at least some examples of the presently disclosed subject matter is that a composite air vehicle is provided from two air vehicles, wherein the two air vehicles are essentially similar or identical to one another, and enables any such air vehicle to be easily replaced in the event of damage or malfunction, to thereby easily provide another similar composite air vehicle.

Another feature of at least some examples of the presently disclosed subject matter is that a composite air vehicle is provided from two air vehicles, the composite vehicle generating less drag than the sum of the drags generated individually by the two air vehicles when not connected to one another.

Another feature of at least some examples of the presently disclosed subject matter is that a composite air vehicle is provided from two air vehicles, the composite vehicle providing higher endurance and/or range and/or payload capacity than the respective endurance and/or range and/or payload capacity provided individually by each of the two air vehicles when not connected to one another.

Another feature of at least some examples of the presently disclosed subject matter is that by providing a composite air vehicle assembled from two independently flyable air vehicles, a user can decide, for example according to specific mission parameters, whether a single such air vehicle is to be used for carrying out the mission, or whether instead two such air vehicles are to be assembled to provide a composite air vehicle for carrying out the mission. For example, such mission parameters can include a specific combination of range, endurance and payload, and such a choice can be based on whether this combination cannot be achieved using a single air vehicle, or whether it can only be achieved using the composite vehicle.

Another feature of at least some examples of the presently disclosed subject matter is that a composite air vehicle can be provided from two air vehicles in which one air vehicle of the composite air vehicle can be used to store and provide additional fuel or electrical energy for the other air vehicle while assembled as the composite air vehicle.

Another feature of at least some examples of the presently disclosed subject matter is that a composite air vehicle can be provided from two air vehicles in which each air vehicle of the composite air vehicle can be operated in different manner when assembled in the composites air vehicle or when flown by itself in terms of the manner on which respective control moments are generated.

Another feature of at least some examples of the presently disclosed subject matter is that a composite air vehicle can be provided from two air vehicles in which each of the two air vehicles has its respective propulsion system, and in which the two propulsion systems can be individually controlled in the respective composite air vehicle.

Another feature of at least some examples of the presently disclosed subject matter is that a composite air vehicle can be provided from two air vehicles with very little or no modification of the original air vehicles, and thus allows for providing a composite air vehicle using at least some types of already existing air vehicles.

Another feature of at least some examples of the presently disclosed subject matter is that a composite air vehicle can be provided from two air vehicles in which each air vehicle of the composite air vehicle can be operated via the controller of one of the two air vehicles operating as a "master" controller, whereas the controller of other one of the two air vehicles is operating as a "slave" controller.

Another feature of at least some examples of the presently disclosed subject matter is that a composite air vehicle can be provided from two air vehicles in which each air vehicle of the composite air vehicle provides redundancy to the composite air vehicle in one or more systems. For example, such redundancy can be provided regarding the controller of the composite air vehicle, in which the respective controller of one of the two air vehicles operates as a "master" controller, whereas the controller of other one of the two air vehicles operates as a "slave" controller. In such a case if the "master" controller fails, the two controllers can switch roles and the formerly "slave" controller now becomes the master controller. In another example, such redundancy can be provided regarding the propulsion system—for example if the propulsion system of one of the two air vehicles in the composite air vehicle fails, the propulsion system of the other air vehicle can operate to provide powered flight to the composite air vehicle. In another example, such redundancy can be provided regarding the stability and control system for providing stability and control moments in pitch, yaw and roll—for example if the stability and control system of one of the two air vehicles in the composite air vehicle fails, the stability and control system of the other air vehicle can operate to provide stability and control moments to the composite air vehicle during flight.

Another feature of at least some examples of the presently disclosed subject matter is that a composite air vehicle can be provided from two air vehicles in which the composite air vehicle can be operated at an elevated air safety level—i.e., in a safer manner than each of the two air vehicles when flying separately and independently of one another. For example, the two air vehicles can be arranged with respect to one another in the composite air vehicle such that the front air vehicle stalls as the angle of attack of the composite air vehicles is increased, thereby first inducing a nose-down pitching moment to the composite air vehicle to restore flow over the wings of the front air vehicle and thereby preventing full stall of the composite air vehicle.

Another feature of at least some examples of the presently disclosed subject matter is that a composite air vehicle can be provided from two air vehicles in which the composite air vehicle can have an expanded range for the axial position of the center of gravity of the composite air vehicle, as compared with the safe range of position of the center of gravity of each of the two air vehicles when flying separately and independently of one another. For example, in cases where each of the two air vehicles is of a flying wing type air vehicle the respective center of gravity must remain within a narrow axial range of positions in each air vehicle while flying independently of one another, while in the respective composite air vehicle, the resulting tandem wing arrangement allows trimming via the aft air vehicle and thus allows for a larger axial range of positions for the location of the center of gravity of the composite air vehicle.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Figure 1:
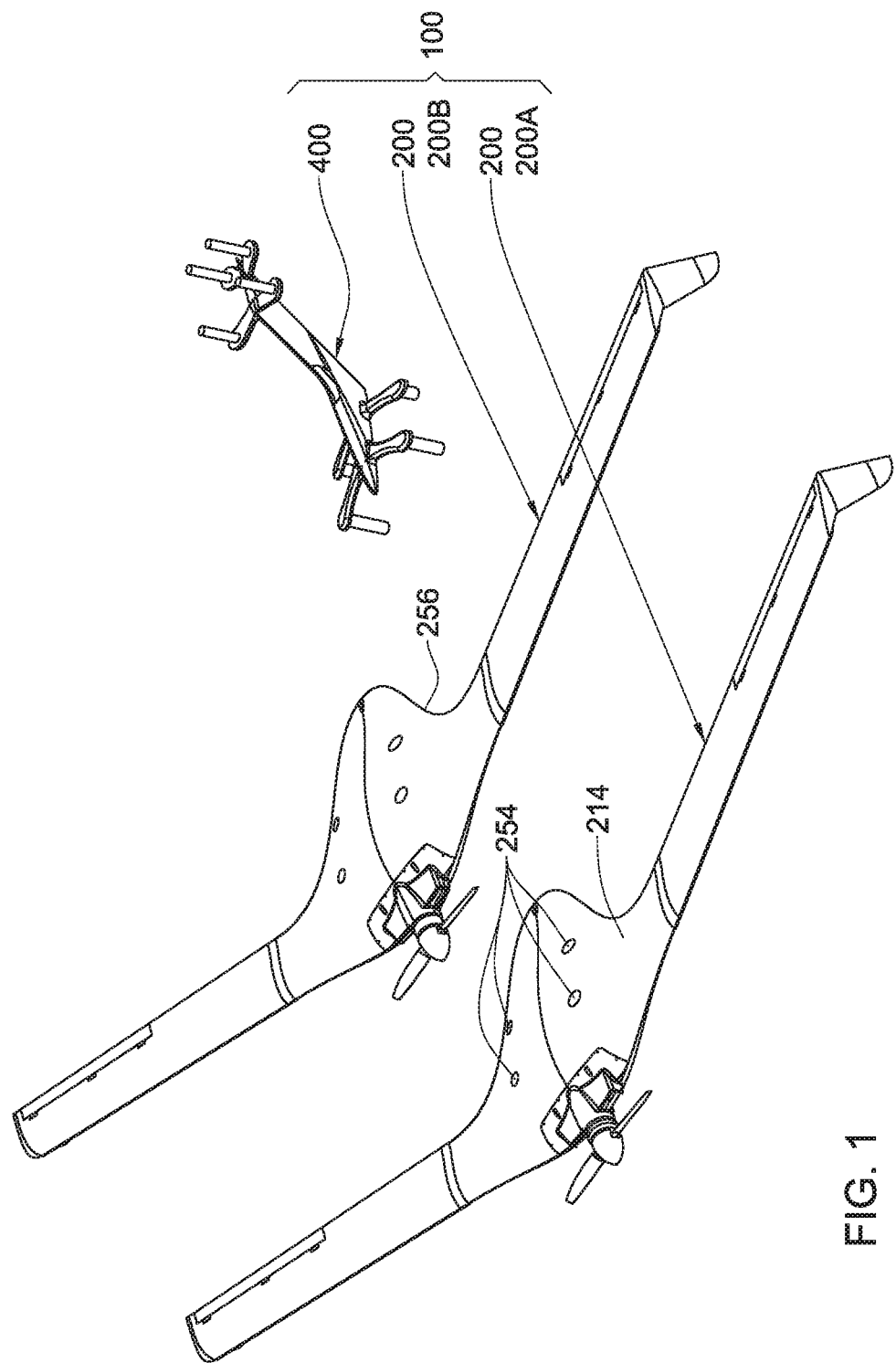
FIG. 1 shows in isometric front-top-side view an example of a composite air vehicle system according to an aspect of the presently disclosed subject matter.
Figure 2:
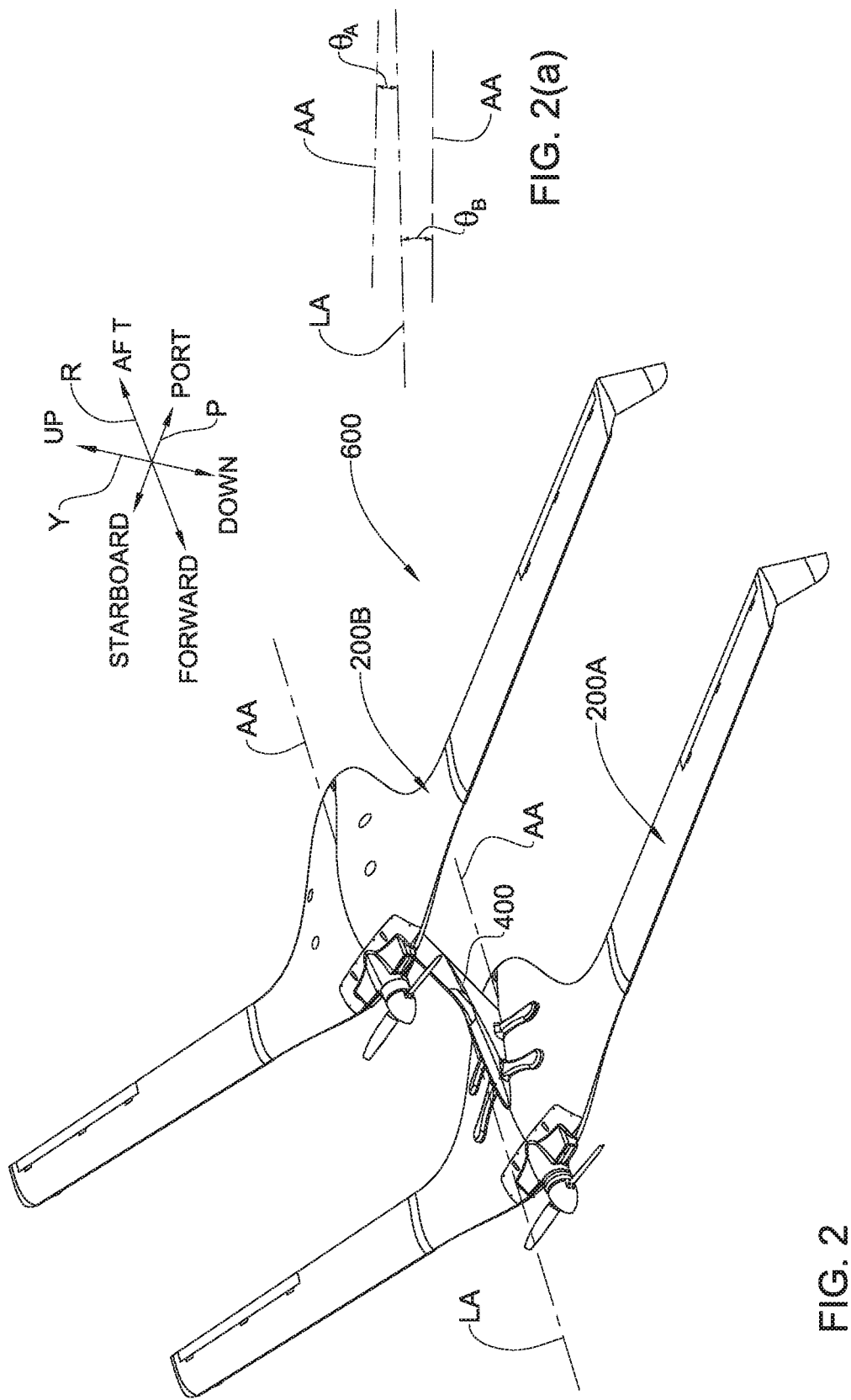
FIG. 2 shows in isometric front-top-side view an example of a composite air vehicle provided by the composite air vehicle system example of FIG. 1.
Figure 3:
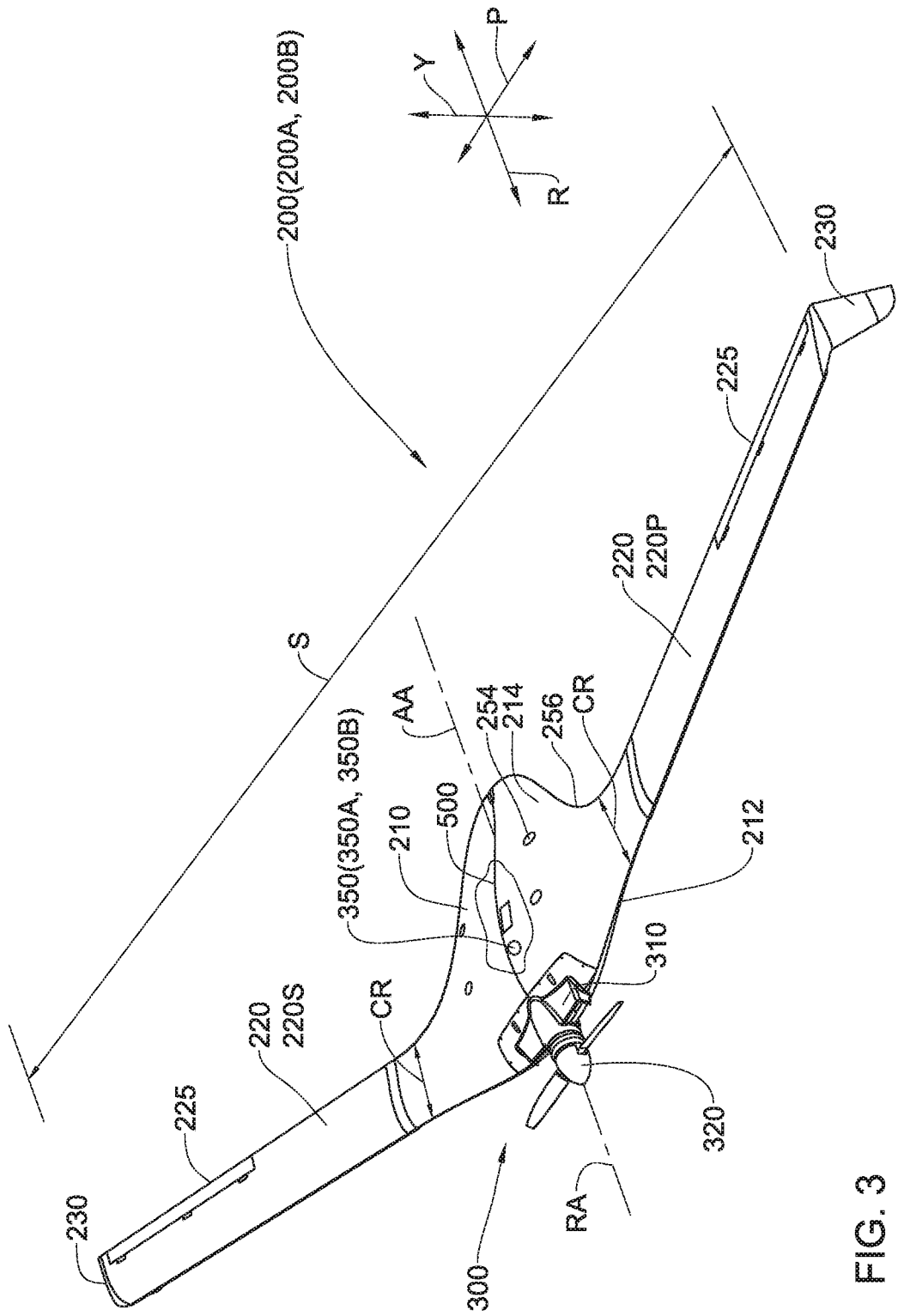
FIG. 3 shows in isometric front-top-side view an example of a modular air vehicle provided by the composite air vehicle system example of FIG. 1.

According to a first aspect of the presently disclosed subject matter, and referring to FIGS. 1, 2, 3, a composite air vehicle system according to a first example of the presently disclosed subject matter, generally designated 100, comprises a first air vehicle 200A, a second air vehicle 200B, and a connector element 400.

As will become clearer herein, each said first air vehicle 200A is capable of independent aerodynamic flight, each said second air vehicle 200B is also capable of independent aerodynamic flight.

Furthermore, in at least this example, each connector element 400 is configured for reversibly interconnecting one such first air vehicle 200A and one such second air vehicle 200B together in tandem arrangement to provide a composite air vehicle 600, wherein the composite air vehicle 600 is also capable of aerodynamic flight. As will also become clearer herein, the composite air vehicle system 100 is also configured for enabling at least in-flight separation of composite air vehicle 600 into the respective first air vehicle 200A and second air vehicle 200B, and for enabling each air vehicle 200A, 200B, to operate independently of one another, in particular for enabling each air vehicle 200A, 200B, to be controllably flown independently of one another.

In at least this example, the first air vehicles 200A are similar or identical to one another, at least in design, aerodynamic characteristics and size. Furthermore, in at least this example, the second air vehicles 200B are similar or identical to one another, at least in design, aerodynamic characteristics and size. Furthermore, in at least this example, the first air vehicles 200A are also similar to each of the second air vehicles 200B. Thus, for simplicity, the reference numeral 200 is designated herein as also referring to each one of the first air vehicle 200A and the second air vehicle 200B; thus any reference herein to "air vehicle 200" relates equally to the first air vehicle 200A and the second air vehicle 200B.

Thus, according to an aspect of the presently disclosed subject matter, each air vehicle 200 can be considered to be a modular air vehicle, configured for interchangeably being (i.e., taking the role of) the first air vehicle 200A or for interchangeably being (i.e., taking the role of) the second air vehicle 200B.

In alternative variations of this example, and in other examples, each one of the first air vehicles 200A can be different from one another, and/or, each one of the second air vehicles 200B can be different from one another, and/or at least one of the first air vehicles 200A can be different from at least one of the second air vehicles 200B.

Referring in particular to FIG. 3, in at least this example, each air vehicle 200 (i.e., each first air vehicle 200A and each second air vehicle 200B) is configured with a flying wing aerodynamic configuration, i.e., having a tail-less configuration. Each air vehicle 200 comprises a fuselage 210, and a pair of fixed wings 220, comprising a port wing 220P and a starboard wing 220S, affixed to the fuselage 210 in fixed-wing relationship. In at least this example the wings 220 have a relatively large span to chord ratio, and are swept back. In at least this example each wing 220 has a winglet 230 at the respective wingtip, and the winglets 230 are anhedrally disposed with respect to the wings at a large anhedral angle, greater than 80°. In at least this example the wingspan S from the wing tip of port wing 220P to wing tip of starboard wing 220S is considerably greater than the root cord CR of each wing.

In at least this example, the fuselage 210 is a blended-body type of fuselage, the shape thereof blending smoothly with the shape of the wings 220. In alternative variations of this example and in other examples, the fuselage can have any other suitable form.

In any case, the fuselage 210 comprises an upper fuselage surface 214 and a lower fuselage surface 212.

The fixed wings 220 are configured for selectively providing control moments in each one of pitch, roll and yaw to the respective air vehicle 200, about the correspond pitch axis p, roll axis r and yaw axis y of the respective air vehicle 200. It is also to be noted, and as will become clearer herein, the fixed wings 220 of each air vehicle 200 also provide control moments in at least one of pitch, roll and yaw to the composite air vehicle 600, about the respective pitch axis P, roll axis R and yaw axis Y of the composite air vehicle 600, when the at least one first air vehicle 200A is interconnected to the at least one second air vehicle 200B, via the at least one connector element 400.

In alternative variations of this example, and in other examples, each air vehicle 200 can have a different aerodynamic configuration from the aforesaid flying wing aerodynamic configuration, for example other tail-less configurations, including for example blended wing-body configurations, delta wing configurations, and/or can have a "variable geometry" (for example swing-wing or oblique-wing) configuration, and/or can have a zero-swept or forward swept configuration, or can have a crescent wing configuration or a cranked arrow wing configuration, or M-wing configuration or W-wing configuration, and/or can include canards, and/or can omit the aforesaid winglets or have a different spatial relationship between the respective wings and winglets.

In at least this example, each air vehicle 200 (i.e., each first air vehicle 200A and each second air vehicle 200B) comprises a propulsion system 300 configured for enabling the respective air vehicle 200 to be independently operated under powered flight. In this example, the propulsion system 300 comprises a powered rotary drive 310 coupled to a propeller 320, and the propeller 320 is a puller (tractor) propeller. Furthermore, the powered rotary drive 310 includes at least one electric motor for providing torque to the propeller 320. In this example, the propeller 320 has a rotational axis RA that is at least parallel, and optionally co-aligned, with the longitudinal axis AA of the air vehicle 200 or of the fuselage 210.

In alternative variations of this example, and in other examples, each air vehicle 200 can have a different configuration for the propulsion system 300. For example, the propulsion system 300 can instead comprise one or more powered rotary drives 310 coupled to a plurality of propellers 320 (in which for example the propellers in each adjacent pair of propeller can be contra-rotating about the same axis, or in which the propellers rotate about different respective rotary axes, for example off-set with respect to the longitudinal axis AA), and/or in which at least one said propeller is a pusher propeller, and/or in which at least one such powered rotary drive includes at least one fuel powered combustion engine (including a respective fuel system) for providing torque to the respective propeller(s). In these or yet other alternative variations of the example of FIG. 3, the propeller(s) can be replaced with ducted fans, and/or the propulsion system 300 can instead comprise one or more turbojets, turbofans or turboprop configurations.

In at least this example, the fuselage 210 accommodates an electrical power source, and/or a power source for the propulsion system 300, and/or a communication system for receiving and/or transmitting data including control signals.

In at least this example, for each air vehicle 200, the respective fuselage 210 accommodates a payload 500. For example, the payload 500 can be similar for the first air vehicle 200A and for the second air vehicle 200B of the composite air vehicle 600, for example each payload 500 comprises an imaging system.

Alternatively, each air vehicle 200 of the composite air vehicle 600 can have a different type of payload 500. For example, the first air vehicle 200A of the composite air vehicle 600 can have a payload 500 comprising an imaging system, while the second air vehicle 200B of the composite air vehicle 600 can have a different payload 500 comprising additional batteries and/or fuel tank to increase the range of the composite air vehicle 600.

For example, such an imaging system payload can include any commercially available or otherwise suitable or specially designed: electro-optical system and/or radar (for example SAR, conventional maritime radar) and/or any suitable sensors, for example ELINT or COMINT, and so on.

In at least this example, each air vehicle 200 accommodates a controller 350, for example a control and navigation computer, including GPS. Thus, each one of first air vehicle 200A comprises a respective first controller 350A for controlling at least in-flight operation of the respective said first air vehicle 200A, and each one of second air vehicle 200B comprises a respective second controller 350B for controlling at least in-flight operation of the respective said second air vehicle 200B. When not otherwise specified, any reference herein to "controller 350" relates equally to the first controller 350A and the second controller 350B.

According to an aspect of the presently disclosed subject matter, the composite air system 100 is configured for operatively coupling the first controller 350A of the first air vehicle 200A with the second controller 350B of the second air vehicle 200B, at least in the respective composite air vehicle 600. For example, such operative coupling can be achieved via suitable umbilical—for example an electrical and/or electronic wiring can be provided between the first air vehicle 200A and the second air vehicle 200B, for example via a free umbilical cord between the first air vehicle 200A and the second air vehicle 200B, or via an umbilical cord associated with the connector element 400. Additionally or alternatively, for example, such operative coupling can be achieved via suitable wireless communication between the first air vehicle 200A and the second air vehicle 200B.

According to an aspect of the presently disclosed subject matter, such operative coupling between the first controller 350A and the second controller 350B can take the form in which one such controller 350, for example the first controller 350A, is a "master" controller, while the other one such controller 350, for example the second controller 350B, is a "slave" controller (or vice versa). In such cases, in the composite air vehicle 600, the master controller directly controls operation of the host air vehicle 200, in the above example the first air vehicle 200A, and the master controller also controls operation of the other air vehicle 200, in the above example the second air vehicle 200B, but via the slave controller. In such cases, once the composite air vehicle 600 separates into the first air vehicle 200A and second air vehicle 200B, each controller 350A, 350B, respectively operates the respective air vehicle independently, and the two controllers no longer operate as a master controller and slave controller, allowing each of the two air vehicles to be flown independently of one another.

According to an aspect of the presently disclosed subject matter, the composite air system 100 is configured for operatively coupling operation of the propulsion system 300 of the first air vehicle 200A with operation of the propulsion system 300 of the second air vehicle 200B, at least in the respective composite air vehicle 600. For example, such operative coupling can be achieved via the controller of one or the other air vehicle 200 in the composite air vehicle 600. For example, such a controller 350 can be the "master" controller in examples in which the one such controller 350, for example the first controller 350A, is a "master" controller, while the other one such controller 350, for example the second controller 350B, is a "slave" controller (or vice versa). According to this of the presently disclosed subject matter, the two propulsion systems 300 can be operated concurrently, at the same power rating or at different power ratings, or only one of the two propulsion systems 300 can be operated at specific times, or at other times none of the two propulsion systems 300 is operated to provide power.

For example, to provide maximum acceleration or to climb quickly to a predetermined altitude, both propulsion systems 300 can be concurrently operated to provide forward propulsion, typically each propulsion system 300 operating at maximum power rating. For cruise or endurance it is possible to operate the propulsion systems 300 such that only one of the two propulsion systems 300 operates to provide propulsive power to the composite air vehicle 600, or that the propulsive power requirements of the composite air vehicle 600 is shared equally or in different proportions by the two propulsion systems 300, for example such as to maximize efficiency of the propulsion systems 300.

For example, the two propulsion systems 300 can be individually controlled to each provide a different level of thrust to thereby generate a pitch moment about the composite center of gravity $CG_C$, for example to trim the composite air vehicle 600, or to enhance or provide a desired pitch to the composite air vehicle 600.

Additionally or alternatively the two propulsion systems 300 can be individually controlled to each provide a different level of thrust to thereby improve fuel efficiency and/or aerodynamic efficiency of the composite air vehicle 600, and/or to enhance loiter and/or to enhance range (cruise) of the composite air vehicle 600.

In at least this example, and in other examples, each air vehicle 200 is further configured to allow the respective air vehicle 200 to come to a soft landing. For example, the air vehicle 200 comprises a parachute system that is deployed prior to landing so that the air vehicle 200 lands via the parachute (optionally the air vehicle 200 having attained an inverted configuration in which the upper fuselage surface 214 is facing downwards and the lower fuselage surface 212 is facing upwards). Additionally or alternatively, each air vehicle can have a suitable undercarriage system for horizontal or vertical landing, for example wheels, air cushion, skids, etc.

Figure 4A:
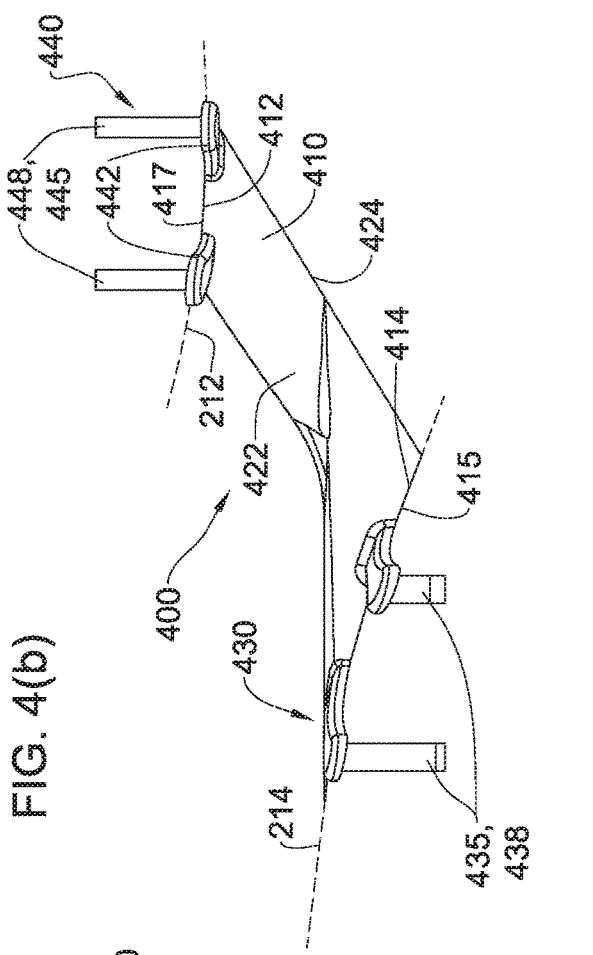
FIG. 4(a), FIG. 4(b), FIG. 4(c), FIG. 4(d) respectively show in isometric front-top-side view, side view, front view and top view, an example of a connector element provided by the composite air vehicle system example of FIG. 1.
Figure 4B:
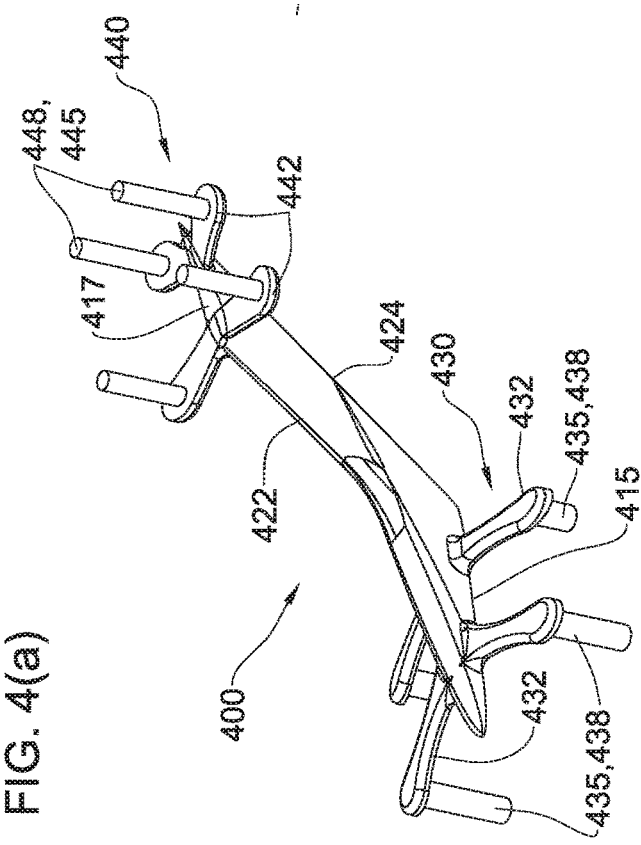
Figure 4D:
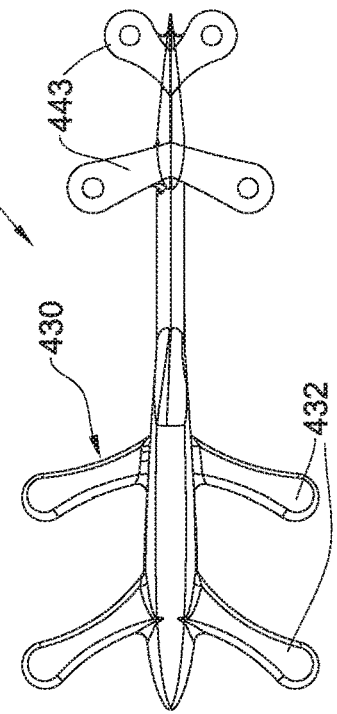
Figure 4C:
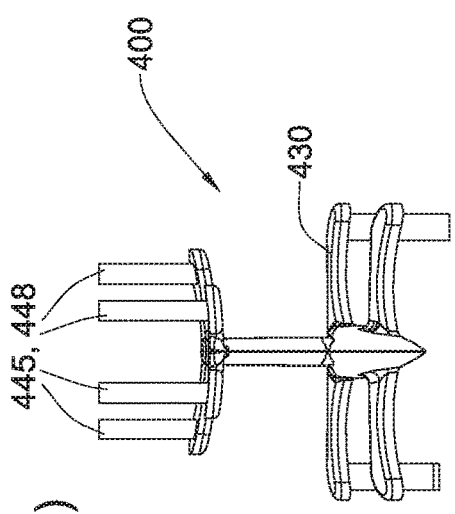

Referring in particular to FIG. 1 and to FIGS. 4(a) to 4(b), the connector element 400 is configured for interconnecting one first air vehicle 200A and one second air vehicle 200B together in a tandem arrangement, to provide the respective composite air vehicle 600, in which the two air vehicles 200 are at least partially spaced longitudinally with respect to one the other, i.e. with respect to the longitudinal axis LA of the composite air vehicle 600.

In alternative variations of this example and in other examples, more than one connector element, for example two, three or more than three suitable connector elements, can be provided for interconnecting one first air vehicle 200A and one second air vehicle 200B together in a tandem arrangement to provide the respective composite air vehicle.

Referring also to FIG. 2 and FIG. 2(a), the longitudinal axis LA is either parallel to the longitudinal axis AA of one or both of the first air vehicle 200A and of the second air vehicle 200B, or, the longitudinal axis LA is inclined to the longitudinal axis AA of one or both of the first air vehicle 200A and of the second air vehicle 200B by a respective angular displacement, $\theta_A$ or $\theta_B$, respectively, taken about the pitch axis P of the composite air vehicle 600. For example, each one of angular displacements $\theta_A$ or $\theta_B$ can be in the range between 0° and about ±5°, or in the range between 0° and about ±10°, or in the range between 0° and about ±15°.

In particular, the longitudinal axis AA of the first air vehicle 200A it this example can be inclined with respect the longitudinal axis of the second air vehicle 200B (in pitch) such that the wings of the first air vehicle 200A have a larger angle of attack than that of the wings of the second air vehicle 200B. For example, the first air vehicle 200A can be inclined with respect the longitudinal axis LA such that the wings of the first air vehicle 200A have a first angle of attack $\alpha_A$, while the second air vehicle 200B can be inclined with respect the longitudinal axis LA such that the wings of the second air vehicle 200B have a second angle of attack as. In such a case, the first angle of attack $\alpha_A$ is greater than the second angle of attack as, by an angular difference $\Delta\alpha$. In at least this example, this angular difference $\Delta\alpha$ is non-zero and positive. For example, in at least this example this angular difference $\Delta\alpha$ is in the range 1° to 3°, while in alternative variations this angular difference $\Delta\alpha$ is in the range 0° and about ±5°, while in yet other alternative variations this angular difference $\Delta\alpha$ is zero.

In any case, in at least this example, in which this angular difference $\Delta\alpha$ is non-zero and positive, such a configuration can offer certain safety features. For example, if the composite air vehicle 600 begins to pitch up such that the angle of attack of the wings would exceed the stall angle of attack, then the wings of the first air vehicle 200A would stall first, leading to a nose down pitch moment for the composite air vehicle 600 due to loss of lift of the first air vehicle 200A in the composite air vehicle 600, and in that manner full stall of the composite air vehicle 600 is avoided, and flow is restored over the wings of first air vehicle 200A. In alternative variations of this example in which the first air vehicle 200A is positioned aft of the second air vehicle 200B via the connector element 400, then the forward spaced second air vehicle 200B is fixed with a larger angle of attack than the aft-spaced first air vehicle 200A.

Figure 5:
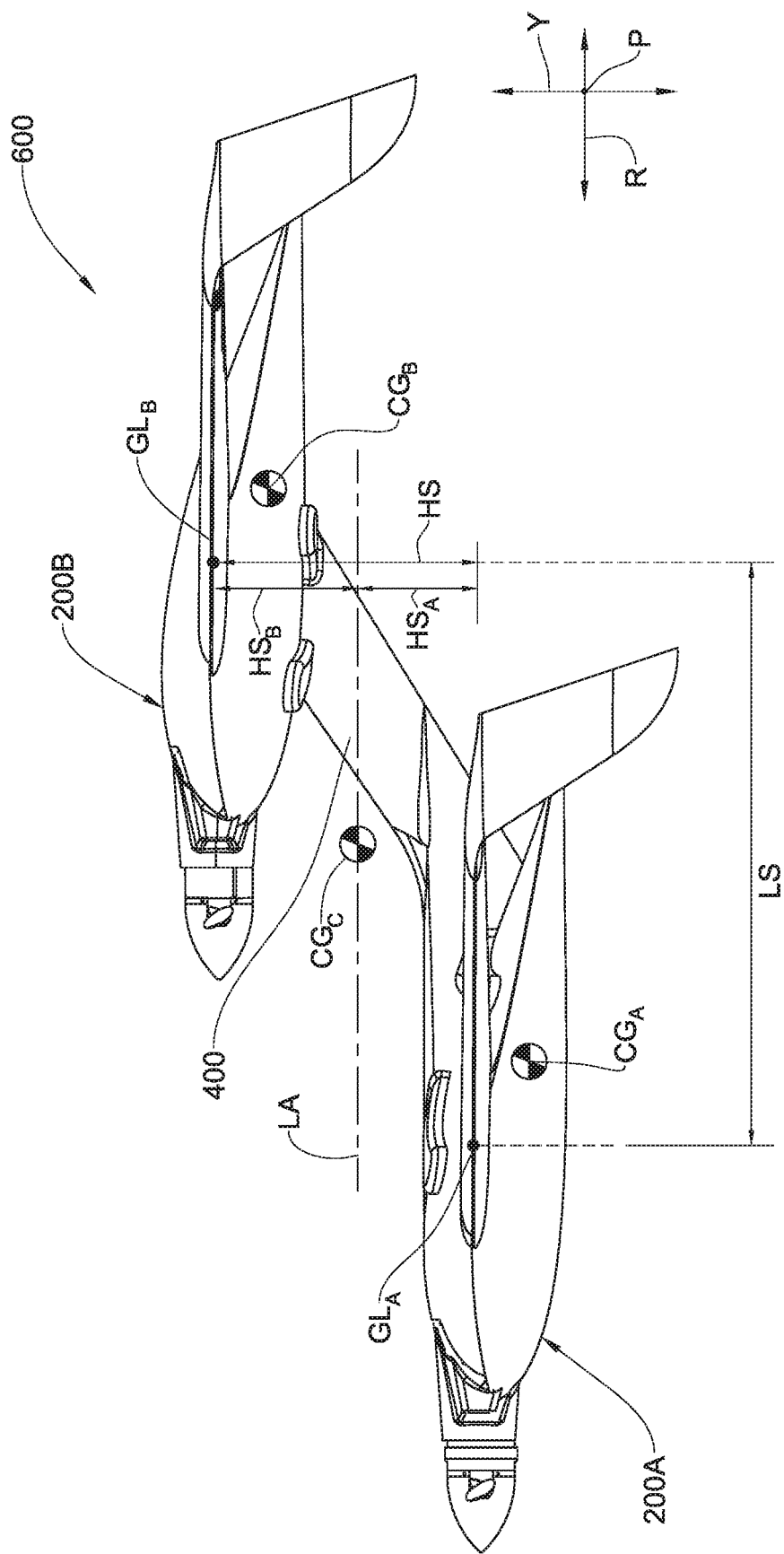
FIG. 5 shows in side view the composite air vehicle example of FIG. 2.

In at least this example, and referring to FIGS. 2 and 5 in particular, the tandem arrangement is such that in the composite air vehicle 600 the second air vehicle 200B is positioned aft spaced (in a direction parallel to the roll axis R) by a spacing. In at least this example, in the tandem arrangement the first air vehicle 200A and the second air vehicle 200B are also in overlapping relationship (in plan view) so that a forward portion of the second air vehicle 200B is in overlapping relationship with an aft portion of the first air vehicle 200A.

In alternative variations of this example, and in other example, the spacing can be zero, such as there is no overlap between the first air vehicle 200A and the second air vehicle 200B, and there is nominally zero axial spacing between a forward portion of the second air vehicle 200B and an aft portion of the first air vehicle 200A.

In yet other alternative variations of this example, and in other example, the spacing can be negative, such as there is no overlap between the first air vehicle 200A and the second air vehicle 200B, and there is also a non-zero axial spacing between a forward portion of the second air vehicle 200B and an aft portion of the first air vehicle 200A.

The size of this spacing can be chosen such as to improve the aerodynamic stability and control of the composite air vehicle 600, for example by providing a larger moment arm for pitch (via the aft air vehicle) and allowing or maximizing decoupling of roll and pitch (for the forward air vehicle).

In some such cases, for example, the spacing can be chosen according to project constraints or mission constraints, even when this can affect the aerodynamic stability and control of the composite air vehicle 600

In at least this example, the tandem arrangement is also such that in the composite air vehicle 600 the second air vehicle 200B is also positioned upwardly spaced (parallel to the yaw axis Y) with respect to the first air vehicle 200A to provide a gap.

The size of this gap can be chosen such as to improve the aerodynamic efficiency of the composite air vehicle 600, for example by providing a so-called biplane effect.

In alternative variations of this example, and in other example, this gap can be nominally zero or very small, for example. In some such cases, for example, the size of the gap can be chosen according to project constraints or mission constraints, even when this can affect the aerodynamic efficiency of the composite air vehicle 600.

In alternative variations of this example, the tandem arrangement can instead be such that the in the composite air vehicle 600 the second air vehicle 200B is positioned forward spaced (parallel to the roll axis R) and also upwardly spaced (parallel to the yaw axis Y) with respect to the first air vehicle 200A. In yet other alternative variations of this example, the tandem arrangement can instead be such that the in the composite air vehicle 600 the second air vehicle 200B is positioned forward or aft spaced (parallel to the roll axis R) but not also upwardly spaced (parallel to the yaw axis Y) with respect to the first air vehicle 200A.

In at least this example, and referring again to FIGS. 2 and 5 in particular, the tandem arrangement is such that in the composite air vehicle 600 the second air vehicle 200B is fixed in position aft spaced (parallel to the roll axis R) by a longitudinal spacing LS, and also fixed in position upwardly spaced (parallel to the yaw axis Y) by a height spacing HS with respect to the first air vehicle 200A.

In at least this example, and referring to FIG. 5 in particular, the longitudinal spacing LS, and the height spacing HS, can be defined with respect to convenient geometrical locations $GL_A$, $GL_B$ (for example, the spacing between geometrical locations $GL_A$, $GL_B$ in a direction parallel to the yaw axis Y), with reference to the first air vehicle 200A and of the second air vehicle 200B, respectively. For example, the geometrical locations $GL_A$ for the first air vehicle 200A can be defined as a specific location of the root cord (for example ¼ chord from the leading edge) of the two wings as projected onto the yaw-roll plane (along which both the yaw axis y and the roll axis r of the respective first air vehicle 200A). Similarly, for example, the geometrical locations $GL_B$ for the second air vehicle 200B can be defined as a specific location of the root cord (for example ¼ chord from the leading edge) of the two wings as projected onto the yaw-roll plane (along which both the yaw axis y and the roll axis r of the respective first air vehicle 200B). Alternatively, the geometrical locations $GL_A$, $GL_B$, can be defined in a different manner with reference to the first air vehicle 200A and the second air vehicle 200B, respectively, for example, with respect to the locations of the respective centers of gravity $CG_A$, $CG_B$ of the respective air vehicle (when dry (no fuel) or both fully fueled) and with no payload (or having similar payloads at least in terms of weight and weight distribution of the payloads). In at least this example the height spacing HS can be related to the wingspan S via height spacing ratio HR, wherein:

$$HR=HS/S$$

For example, the height spacing ratio HR is 0.1 to 0.4 or in the range 0.1 to 0.5.

The height spacing HS can be divided into a first height spacing $HS_A$ (for example corresponding to the spacing between the geometrical location $GL_A$ and the location of the center of gravity $CG_C$, in a direction parallel to the yaw axis Y), and a second height spacing $HS_B$ (for example corresponding to the spacing between the geometrical location $GL_B$ and the location of the center of gravity $CG_C$, in a direction parallel to the yaw axis Y).

In at least this example the longitudinal spacing LS can be chosen to provide enhanced aerodynamic efficiency for the tandem configuration.

The connector element 400 is generally in the form of a load-bearing pylon-like structure, reversibly engageable with respect to hard points provided in each one of the first air vehicle 200A and second air vehicle 200B.

Referring in particular to FIGS. 4(a) to 4(d), the connector element 400 comprises a spacer body 410 having an upper end 412 and a lower end 414 spaced from one another height wise as well as longitudinally, for thereby providing the required longitudinal spacing LS and height spacing HS.

In at least this example the spacer body 410 is in the form of a connector strut having the necessary mechanical properties for interconnecting the two air vehicles 200 together, and for enabling the thus interconnected air vehicles 200, thereby forming the composite air vehicle 600, to be flown as a single unit. For example, mechanical properties can include mechanical rigidity, load bearing capability, and sufficient internal volume for: cables for communication and/or control signals for operating one or both air vehicles 200; cables for the flow of electrical power between the air vehicles 200; conduits for the transfer of fuel (where appropriate) between the air vehicles 200.

Furthermore, in at least this example the spacer body 410 is also aerodynamically contoured to minimize drag. Thus in at least this example the spacer body 410 is in the form of an aerodynamic vertical fin, having an aerofoil-like cross-section, a leading edge 422 and a trailing edge 424. The connector element 400, in particular the spacer body 410, has a swept-back aerodynamic configuration, which facilitates providing the required longitudinal spacing LS and height spacing HS.

In at least this example, the spacer body 410 is also configured for operatively coupling the air vehicle 200A with respect to the second air vehicle 200B, to enable one or more of the following to be interchanged between the air vehicle 200A and the second air vehicle 200B: communication and/or control signals for operating one or both air vehicles 200; flow of electrical power between the air vehicles 200; transfer of fuel (where appropriate); between the air vehicles 200; other wiring. In this connection, the spacer body 410 can include one or more channels extending between the upper end 412 and a lower end 414 for accommodating buses, electrical cables, fuel conduits and so on therebetween.

The lower end 414 is configured for reversibly affixing the connector element 400 to the first air vehicle 200A. In particular, the lower end 414 is configured for reversibly affixing the connector element 400 to the upper fuselage surface 214 of first air vehicle 200A.

In this connection, the lower end 414 comprises a first connection arrangement 430 configured for reversibly affixing the connector element 400 to the upper fuselage surface 214 of first air vehicle 200A.

The lower end 414 comprises a lower edge 415, and the first connection arrangement 430 comprises a plurality of outwardly projecting brackets 432 configured for reversibly affixing the connector element 400 to the upper fuselage surface 214 of first air vehicle 200A. In at least this example, the first connection arrangement 430 comprises four such outwardly projecting brackets 432, but in alternative variations of this example and in other examples, the first connection arrangement 430 comprises less than four or more than four such outwardly projecting brackets 432.

Each bracket 432 has a respective lower surface 433 having a contour generally complementary to the contour of the upper surface 214 of the first air vehicle 200A, and further comprises a respective first coupler 435 for reversibly coupling the respective bracket 432, and thus the connector element 400, with respect to the first air vehicle 200A.

In at least this example, each first coupler 435 comprises a first coupling element 438 that is configured for being reversibly coupled with respect to a second coupling element 254 (see FIG. 1) provided on the upper fuselage surface 214 of the first air vehicle 200A. The second coupling elements 254 are provided in locations generally corresponding to hard points in the first air vehicle 200A.

In at least this example, first connection arrangement 430 is operatively coupled to at least one of the two controllers 350A, 350B, and is configured for electively disengaging the pins 438 with respect to the respective second coupling elements 254 to thereby disengage the connector element 400 from the first air vehicle 200A.

In at least this example, the lower edge 415 has a contour generally complementary to the contour the contour of the upper surface 214 of the first air vehicle 200A, which can contribute to minimizes drag and/or enhance the mechanical connection between the brackets 432 and the lower edge 415.

The upper end 412 is configured for reversibly affixing the connector element 400 to the second air vehicle 200B. In particular, the upper end 412 is configured for reversibly affixing the connector element 400 to the lower fuselage surface 212 of second air vehicle 200B.

In this connection, the upper end 412 comprises a second connection arrangement 440 configured for reversibly affixing the connector element 400 to the lower fuselage surface 212 of second air vehicle 200B.

The upper end 412 comprises an upper edge 417, and the second connection arrangement 440 comprises a plurality of outwardly projecting brackets 442 configured for reversibly affixing the connector element 400 to the lower fuselage surface 212 of second air vehicle 200B. In at least this example, the second connection arrangement 440 comprises four such outwardly projecting brackets 442, but in alternative variations of this example and in other examples, the second connection arrangement 440 comprises less than four or more than four such outwardly projecting brackets 442.

Each bracket 442 has a respective upper surface 443 having a contour generally complementary to the contour of the lower surface 212 of the second air vehicle 200B, and further comprises a respective second coupler 445 for reversibly coupling the respective bracket 442, and thus the connector element 400, with respect to the second air vehicle 200B.

In at least this example, each second coupler 445 comprises a third coupling element 448 that is configured for being reversibly coupled with respect to a fourth coupling element 256 (FIG. 1) provided on the lower fuselage surface 212 of the second air vehicle 200B. The fourth coupling element 256 are provided in locations generally corresponding to hard points in the second air vehicle 200B.

In at least this example, second connection arrangement 440 is operatively coupled to at least one of the two controllers 350A, 350B, and is configured for selectively disengaging the third coupling elements 448 with respect to the respective fourth coupling elements 256 to thereby disengage the connector element 400 from the second air vehicle 200B.

In at least this example, the upper edge 417 has a contour generally complementary to the contour of the lower surface 212 of the second air vehicle 200B, which can contribute to minimizes drag and/or enhance the mechanical connection between the brackets 442 and the upper edge 417.

Referring in particular to FIG. 5, the first air vehicle 200A has a first center of gravity $CG_A$, the second air vehicle 200B has a second center of gravity $CG_B$, while the composite air vehicle 600 has a composite center of gravity $CG_C$.

For example, the first center of gravity $CG_A$ can be at or close to the geometrical location $GL_A$ for the first air vehicle 200A, for example defined as a specific location of the root cord (for example ¼ chord from the leading edge) of the two wings thereof as projected onto the yaw-roll plane (along which both the yaw axis y and the roll axis r of the respective first air vehicle 200A) Similarly, for example, the second center of gravity $CG_B$ can be at or close to the geometrical locations $GL_B$ for the second air vehicle 200B can be defined as a specific location of the root cord (for example ¼ chord from the leading edge) of the two wings thereof as projected onto the yaw-roll plane (along which both the yaw axis y and the roll axis r of the respective first air vehicle 200B).

In at least this example, and in other examples, in which in composite air vehicle 600 the first air vehicle 200A is longitudinally spaced with respect to the second air vehicle 200B via the connector element 400, the composite center of gravity $CG_C$ is located at a longitudinal position in-between the longitudinal locations of the first center of gravity $CG_A$ and the second center of gravity $CG_B$. In at least this example, and in other examples, the composite center of gravity $CG_C$ is located at a longitudinal position about 50% (±10%) of the longitudinal spacing between the locations of the first center of gravity $CG_A$ and the second center of gravity $CG_B$. However, in alternative variations of this example, and in other examples, the aforesaid longitudinal position about can be different from 50% (±10%) of the longitudinal spacing between the locations of the first center of gravity $CG_A$ and the second center of gravity $CG_B$.

Similarly, in at least this example, and in other examples, in which in composite air vehicle 600 the first air vehicle 200A is also height-wise spaced (orthogonal to the longitudinal axis and the lateral axis) with respect to the second air vehicle 200B via the connector element 400, the composite center of gravity $CG_C$ is located at a height-wise position in-between the longitudinal locations of the first center of gravity $CG_A$ and the second center of gravity $CG_B$. In at least this example, and in other examples, the composite center of gravity $CG_C$ is located at a height-wise position about 50% (±10%) of the height-wise spacing between the locations of the first center of gravity $CG_A$ and the second center of gravity $CG_B$. However, in alternative variations of this example, and in other examples, the aforesaid height-wise position about can be different from 50% (±10%) of the height-wise spacing between the locations of the first center of gravity $CG_A$ and the second center of gravity $CG_B$.

According to an aspect of the presently disclosed subject matter, in at least this example the composite air vehicle 600 can have an expanded range for the axial position of the center of gravity $CG_C$ of the composite air vehicle, as compared with the safe range of position of the center of gravity $CG_A$ or $CG_B$ of each of the two air vehicles 200A, 200B when the two air vehicles 200A, 200B are flying separately and independently of one another. For example, in cases such as in the illustrated example, where the first air vehicle 200A and the second air vehicle 200B is of a flying wing type air vehicle, the respective center of gravity $CG_A$ or $CG_B$ must remain within a narrow axial range of positions in the respective air vehicle while the two air vehicles 200A, 200B are flying independently of one another, since any trimming in pitch via the respective control surfaces of the wings is limited by the relative short moment arm of these control surfaces in the respective air vehicles 200A, 200B. On the other hand, in the respective composite air vehicle 600, the resulting tandem wing arrangement provides a relatively larger moment arm in pitch for the composite air vehicle 600 (via the aft air vehicle 200B, as discussed herein), and allows trimming of the composite air vehicle 600 in pitch via the aft air vehicle 200B for a larger axial range of positions for the location of the center of gravity $CG_C$ of the composite air vehicle 600.

By way of example, the longitudinal axis LA of the composite air vehicle 600 can be defined as being on the yaw-roll plane of the composite air vehicle 600, and passing through the composite center of gravity $CG_C$.

Figure 6:
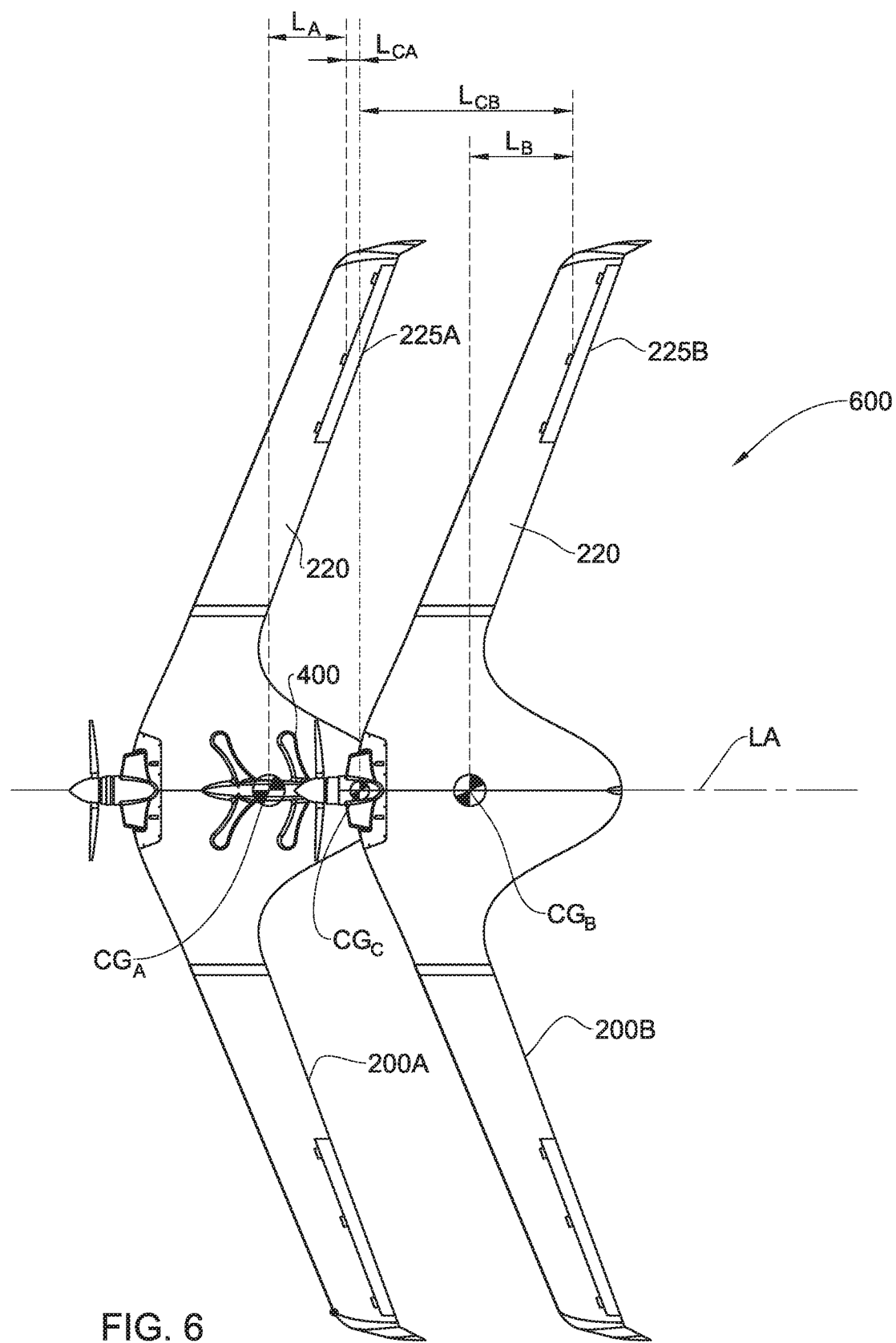
FIG. 6 shows in top view the composite air vehicle example of FIG. 2.

Referring in particular to FIG. 3 and FIG. 6, each air vehicle 200A, 200B has respective control surfaces 225A, 225B in the form of elevons, providing the function of elevator (for pitch control) and aileron (for roll control), for the respective air vehicle 200A, 200B. Each air vehicle 200A, 200B can be designed with in-built yaw stability, and/or can be controllable in yaw, for example via control surfaces provided on the winglets, and/or via selective deployment of airbrakes or spoilers on the wings. In each one of the first air vehicle 200A and the second air vehicle 200B, the respective control surfaces 225A, 225B have a respective longitudinal moment arm LA, LB with respect to the first center of gravity $CG_A$ and the second center of gravity $CG_B$, respectively.

As best seen in FIG. 6, in the composite air vehicle 600, the longitudinal moment arm of control surfaces 225A of the first air vehicle 200A with respect to the composite center of gravity $CG_C$ is $L_{CA}$, while the longitudinal moment arm of control surfaces 225B of the second air vehicle 200B with respect to the composite center of gravity $CG_C$ is $L_{CB}$.

As can be seen in FIG. 6, in at least this example, and in other examples, the longitudinal moment arm $L_{CB}$ is significantly greater than the longitudinal moment arm LB such that in the composite air vehicle 600 the control surfaces 225B of the second air vehicle 200B are more effective at generating control moments in pitch for the composite air vehicle 600 than for the second air vehicle 200B when flying as an independent entity.

Also as can be seen in FIG. 6, in at least this example, and in other examples, the longitudinal moment arm $L_{CA}$ is significantly smaller than the longitudinal moment arm LA such that in the composite air vehicle 600 the control surfaces 225A of the first air vehicle 200A are closer aligned to the composite center of gravity $CG_C$ than in the first air vehicle 200A, and are more effective at generating control moments in roll for the composite air vehicle 600 than for the first air vehicle 200A when flying as an independent entity.

Thus, when operating the composite air vehicle 600 in aerodynamic flight, the control surfaces 225B of the second air vehicle 200B can be used exclusively to provide pitch control to the composite air vehicle 600, while the control surfaces 225A of the first air vehicle 200A can be used exclusively to provide roll control to the composite air vehicle 600. In at least this example, for example, the default setting for the composite air vehicle 600 can be that in aerodynamic flight, the control surfaces 225B of the second air vehicle 200B is used exclusively to provide pitch control to the composite air vehicle 600, while the control surfaces 225A of the first air vehicle 200A is used exclusively to provide roll control to the composite air vehicle 600.

The composite air vehicle 600 can be designed with in-built yaw stability, and/or can be controllable in yaw, for example via control surfaces provided on the winglets of the first air vehicle 200A and/or the second air vehicle 200B, and/or via selective deployment of airbrakes or spoilers on the wings of the first air vehicle 200A and/or the second air vehicle 200B. Additionally or alternatively, the connector element 400 comprises a ruder control surface for providing or enhancing yaw control of the composite air vehicle 600.

Thus, each one of the first air vehicle 200A and the second air vehicle 200B, when assembled into the composite air vehicle 600, can be operated in a different manner to when flying as an independent entity.

For example, each air vehicle 200 can be a commercially available UAV, for example BirdEye 650D UAV, provided by Israel Aerospace Industries (Israel), and if necessary modified in a suitable manner to allow the connector element 400 to be reversibly coupled to the upper fuselage surface thereof (for example via bores 254) or to the lower fuselage surface thereof (for example via bores 256).

Figure 7:
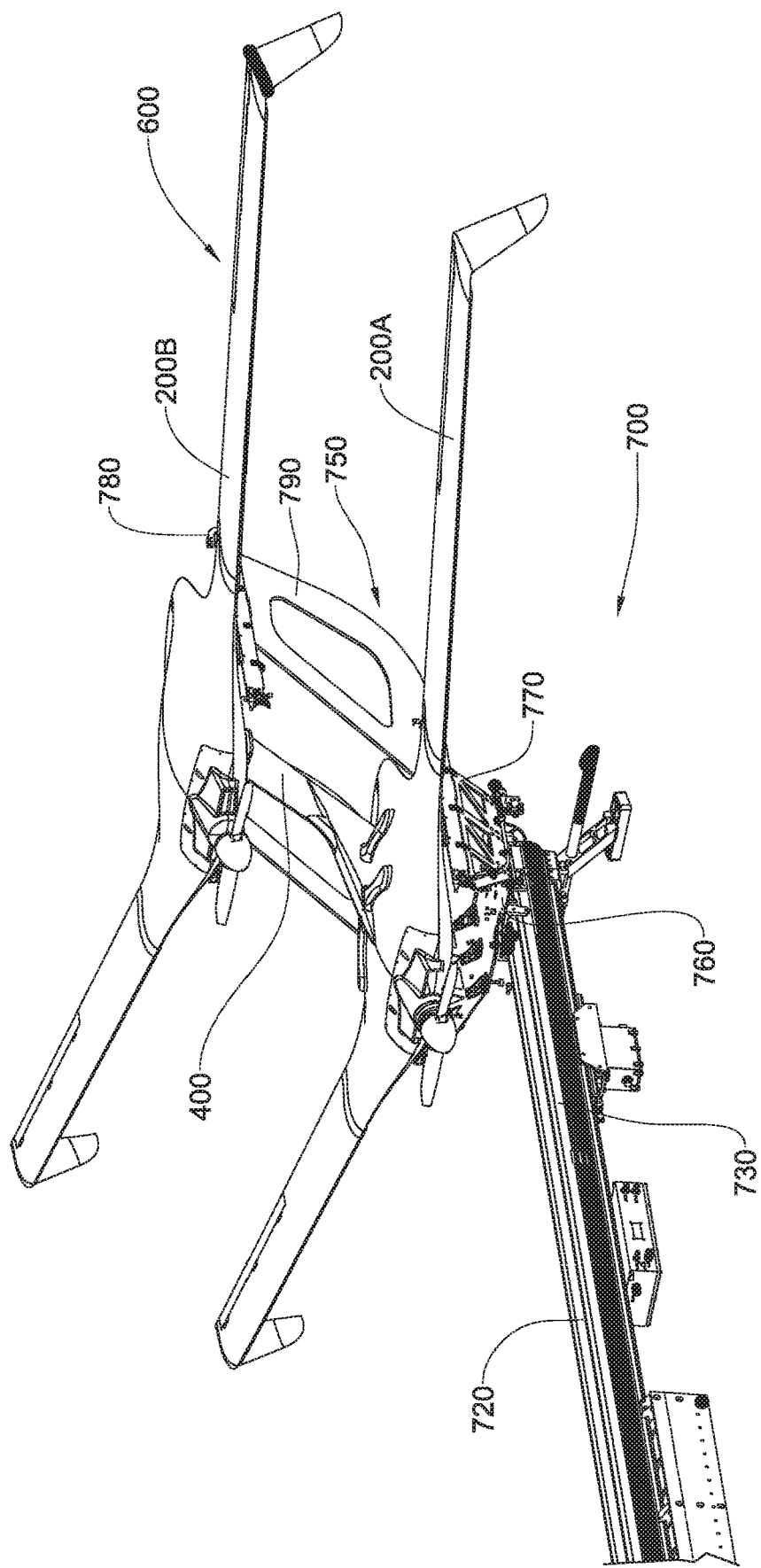
FIG. 7 shows in isometric front-top-side view the composite air vehicle example of FIG. 2 coupled to an example of a launch system according to an aspect of the presently disclosed subject matter.

Referring to FIG. 7, a catapult system 700 can be used for launching the composite air vehicle 600. The catapult system 700 comprises a cradle 750, a track 720 and a acceleration system 730 for accelerating the cradle 750 along the track 720.

The cradle 750 includes a track interface 760 configured for enabling the cradle to be controllably displaced over the track 720 in response to actuation of the acceleration system 730. The cradle 750 further comprises a first support structure 770 configured for supporting the composite air vehicle 600 via the first air vehicle 200A thereof, and a second support structure 780 configured for supporting the composite air vehicle 600 via the second air vehicle 200B thereof. The second support structure 780 is height wise displaced from the first support structure 770 via spacer elements 790, correlated to the height wise spacing HS.

The first support structure 770 and the second support structure 780 are further configured for enabling the composite air vehicle 600 to be released from the cradle 750 at predetermined conditions, for example when the composite air vehicle 600 is sufficiently accelerated to attain aerodynamic flight speed.

Without being bound to theory, the inventors consider that such a composite air vehicle 600 assembled from two air vehicles, in particular two similar air vehicles 200 in tandem configuration as disclosed herein, can provide performance improvements over the performance obtainable from a single such air vehicle 200. For example, the inventors consider that such a configuration for the composite air vehicle 600 can provide such relative performance characteristics perhaps similar to that of conventional tandem wing configurations (in which the two wings have equal spans) in which induced drag can be significantly reduced relative to conventional air vehicles (for example in which the tail has a smaller span than the main wings).

Without being bound to theory, the inventors also consider that such a composite air vehicle 600 assembled from two air vehicles, in particular two similar air vehicles 200 in tandem configuration as disclosed herein, can reduce induced drag as compared with two individual air vehicles 200, and that such a reduction in induced drag can be enhanced by at least one of:

equalizing the lift generated by the two air vehicles 200A, 200B in the composite air vehicle 600; however, the lift generated by the forward air vehicle can be set to be higher than the aft air vehicle to provide enhanced stall characteristics for the composite air vehicle (for example by ensuring that the wings of the forward air vehicle stall first, thereby inducing a nose-down pitch moment for the composite air vehicle, which thus prevents staling of the wings of the aft air vehicle), or desired downwash characteristics etc.;

providing a height-wise spacing HS between the first air vehicle 200A and the second air vehicle 200B (via the connector element 400) such that the height spacing ratio HR (=height spacing HS/span S) is between 0.10 and 0.20, for example in the region of 0.15 (±0.05).

The composite air vehicle system 100 can be used, for example according to method 1000, as follows.

Figure 8:
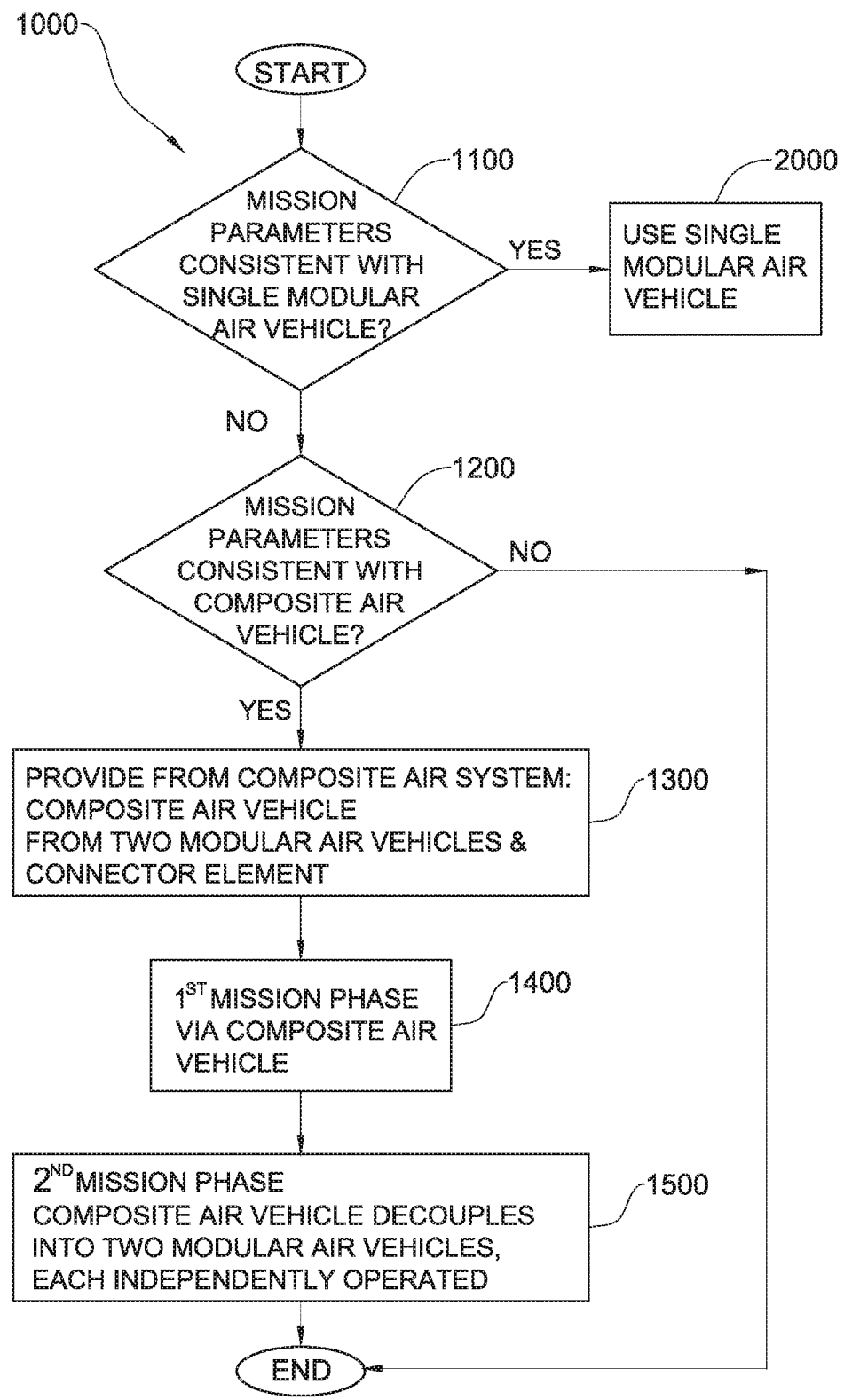
FIG. 8 schematically illustrates an example of a method for using a composite air vehicle system according to an aspect of the presently disclosed subject matter.

Referring to FIG. 8, in a first determination step 1100 of method 1000, mission parameters for a particular mission are considered and compared with performance characteristics of a single air vehicle 200. For example, such mission parameters can include one or more of range, maximum altitude, loiter time, endurance, payload capacity, and so on. If it is determined in step 1100 that such mission parameters can be accomplished using a single air vehicle 200, then the method proceeds to step 2000 in which a single air vehicle 200 is suitably prepared and programmed for the mission, in the normal manner, and dispatched in due course to execute the mission.

On the other hand, if it is determined in step 1100 that such mission parameters cannot be accomplished using a single air vehicle 200, then the method proceeds to step 1200, in which the aforesaid mission parameters are considered and compared with performance characteristics of a composite air vehicle 600 provided from two single air vehicles 200 assembled together in tandem configuration via connector element 400. If the determination is "no", then the method 1000 terminates and a different solution needs to be found regarding the execution of the required mission.

On the other hand if the determination in step 1200 is "yes", the method continues to step 1300, in which a composite air vehicle 600 is provided and operated for a first phase of the mission. As disclosed above, such a composite air vehicle can be provided by coupling together two such air vehicles 200, including a first air vehicle 200A and a second air vehicle 200B coupled together via a connector element 400. For example, in such a tandem arrangement the second air vehicle 200B is spaced aft and upwardly spaced with respect to the first air vehicle 200A via the connector element 400, as illustrated in the figures.

Furthermore, the controllers 350A and 350B can be operatively coupled to one another, for example as disclosed above, such that one such controller 350, for example the first controller 350A, is a "master" controller, while the other one such controller 350, for example the second controller 350B, is a "slave" controller (or alternatively vice versa). The master controller is configured for operating the two air vehicles 200 in the composite air vehicle 600 during the first phase of the mission, in which the two air vehicles 200 are coupled together in the composite air vehicle 600, providing the necessary control moments in pitch and/or roll and/or yaw, each time using the control surfaces of one or both air vehicles 200, for example as disclosed above.

For example, the composite air vehicle 600 can be launched using the launch system 700 as disclosed above.

In the next step 1400, the master controller is further configured for operating the two air vehicles 200 in the composite air vehicle 600 during the first phase of the mission such as to enable the composite air vehicle 600 to achieve the respective mission parameters, including enabling the composite air vehicle 600 to achieve the respective mission objectives.

For example, the mission payload (for example electro optical surveillance equipment) can be provided in the first air vehicle 200A, while the second air vehicle 200B has a payload of additional batteries to extend the operational range and/or time of the composite air vehicle 600. In such a case, the first phase can continue until all the electrical power (for powering the two propulsion systems 300) carried by the second air vehicle 200B is used up. At this point, and with the first air vehicle 200A being fully powered, the method can proceed with step 1400, in which the composite air vehicle 600 decouples the two air vehicles 200 from one another, and the first air vehicle 200A continues with the mission under power, while the second air vehicle 200B makes a landing under zero or minimal power, or self-destructs.

In another example, in step 1400 the composite air vehicle 600 accomplishes the goals of its mission, and then begins its return journey back to base or to another destination, until termination of the first phase, after which the method can proceed with step 1500, in which the composite air vehicle 600 decouples the two air vehicles 200 from one another, and each one of the first air vehicle 200A and the second air vehicle 200B is flown as an independent unit, and subsequently lands.

Thus, in step 1500 the method proceed to a second phase of the method in which the first air vehicle 200A and the second air vehicle 200B are each operated and flown independently of one another. At the beginning of step 1400, the master controller 300 of the composite air vehicle operates the connector element 400 to disengage from the first air vehicle 200A. In at least this example, the connector element 400 remains coupled to the second air vehicle 200B, though in alternative variations of this example the connector element 400 can also be decoupled from the second air vehicle 200B. In yet other alternative variations of this example the connector element 400 is decoupled only from the second air vehicle 200B, but remains coupled to the first air vehicle 200A.

Concurrent with the aforesaid decoupling between the first air vehicle 200A and the second air vehicle 200B, the master controller 350 operates to control only the respective air vehicle, while the slave controller 350 now assumes full control over its respective air vehicle. In this manner, each one of the first air vehicle 200A and the second air vehicle 200B is independently controlled and is independently flown as an independent unit, in due course landing.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims.

The invention claimed is:

1. A composite air vehicle system, comprising:
    a first air vehicle capable of independent aerodynamic flight;
    a second air vehicle capable of independent aerodynamic flight; and
    at least one connector element configured for reversibly interconnecting the first air vehicle and the second air vehicle in tandem arrangement to provide a composite air vehicle capable of aerodynamic flight, wherein said connector element comprises a connector strut having a first end and a second end spaced from one another, and wherein the first end is configured for being reversibly affixed with respect to a dorsal part of the first air vehicle and wherein the second end is configured for being reversibly affixed with respect to a lower belly part of the second air vehicle;
    wherein the composite air vehicle system is configured for enabling at least in-flight separation of the composite air vehicle into said first air vehicle and second air vehicle, and for enabling each one of said first air vehicle and said second air vehicle to operate independently of one another; and
    wherein the first air vehicle and the second air vehicle are each configured to generate aerodynamic lift at least in straight and level flight at least when interconnected to provide the composite air vehicle, to thereby provide aerodynamic lift to the composite air vehicle sufficient to thereby enable said aerodynamic flight of the composite air vehicle.

2. The composite air vehicle system according to claim 1, wherein each one of said first air vehicle and said second air vehicle is configured as an unmanned air vehicle (UAV).

3. The composite air vehicle system according to claim 1, wherein the first air vehicle and the second air vehicle are substantially similar or identical to one another in size and in aerodynamic configuration.

4. The composite air vehicle system according to claim 1, including at least one of the following:
wherein the first air vehicle and the second air vehicle each has a flying wing aerodynamic configuration; or
wherein the first air vehicle and the second air vehicle each has a tail-less aerodynamic configuration.

5. The composite air vehicle system according to claim 1, including one of the following:
wherein each one of first air vehicle and the second air vehicle comprises a fuselage and a pair of fixed wings affixed to said fuselage, wherein said pair of fixed wings are configured for selectively providing control moments in each one of at least pitch and roll to the respective one of said first air vehicle and said second air vehicle; or
wherein each one of first air vehicle and the second air vehicle comprises a fuselage and a pair of fixed wings affixed to said fuselage, wherein said pair of fixed wings are configured for selectively providing control moments in each one of at least pitch and roll to the respective one of said first air vehicle and said second air vehicle, and, wherein each one of the first air vehicle and the second air vehicle further comprises canards.

6. The composite air vehicle system according to claim 1, including one of the following:
wherein each one of first air vehicle and the second air vehicle comprises a propulsion system configured for enabling the respective said first air vehicle or said second air vehicle to be independently operated under powered flight;
wherein each one of first air vehicle and the second air vehicle comprises a propulsion system configured for enabling the respective said first air vehicle or said second air vehicle to be independently operated under powered flight, and, wherein said propulsion system comprises a powered rotary drive coupled to at least one propeller;
wherein each one of first air vehicle and the second air vehicle comprises a propulsion system configured for enabling the respective said first air vehicle or said second air vehicle to be independently operated under powered flight, and, wherein said propulsion system comprises a powered rotary drive coupled to at least one propeller, and, wherein said at least one propeller is at least one of: at least one puller propeller; at least one pusher propeller; or
wherein each one of first air vehicle and the second air vehicle comprises a propulsion system configured for enabling the respective said first air vehicle or said second air vehicle to be independently operated under powered flight, and, wherein said propulsion system comprises a powered rotary drive coupled to at least one propeller, and, wherein said at least one propeller is at least one of at least one puller propeller and at least one pusher propeller, and, wherein said powered rotary drive includes at least one electric motor for providing torque to the propeller, or, wherein said powered rotary drive includes at least one fuel powered combustion engine for providing torque to the propeller.

7. The composite air vehicle system according to claim 1, including one of the following:
wherein each one of first air vehicle and the second air vehicle respectively comprises a first controller and a second controller for controlling at least in-flight operation of the respective said first air vehicle or said second air vehicle; or
wherein each one of first air vehicle and the second air vehicle respectively comprises a first controller and a second controller for controlling at least in-flight operation of the respective said first air vehicle or said second air vehicle, and, wherein in said composite air vehicle said first controller is operatively coupled to said second controller, and wherein said first controller is configured as a master controller and said second controller is configured as a slave controller.

8. The composite air vehicle system according to claim 1, wherein said connector element comprises a connector strut having a first longitudinal end and a second longitudinal end spaced from one another in a elongate direction, the first longitudinal end being configured for reversibly affixing to the first air vehicle and the second longitudinal end being configured for reversibly affixing to the second air vehicle, wherein said elongate direction is an at least partial vertical direction when the composite air vehicle is in straight and level flight.

9. The composite air vehicle system according to claim 1, including one of the following:
wherein the tandem arrangement is such that in the composite air vehicle the second air vehicle is positioned aft spaced in a direction parallel to a roll axis of the composite air vehicle by a non-zero spacing, and, wherein in the tandem arrangement the first air vehicle and the second air vehicle are in overlapping relationship so that a forward portion of the second air vehicle is in overlapping relationship with an aft portion of the first air vehicle;
wherein the tandem arrangement is such that in the composite air vehicle the second air vehicle is positioned aft spaced in a direction parallel to a roll axis of the composite air vehicle by a zero spacing, such that there is nominally zero axial spacing between a forward portion of the second air vehicle and an aft portion of the first air vehicle.

10. The composite air vehicle system according to claim 1, including at least one of the following:
wherein the at least one connector element is further configured for interconnecting the first air vehicle and the second air vehicle in said tandem arrangement such that said second air vehicle is also positioned upwardly spaced with respect to the first air vehicle when the composite air vehicle is in straight and level flight, or, wherein the at least one connector element is further configured for interconnecting the first air vehicle and the second air vehicle in said tandem arrangement such that said first air vehicle is also positioned upwardly spaced with respect to the second air vehicle when the composite air vehicle is in straight and level flight;
wherein the first end comprises a first connection arrangement configured for being reversibly affixed with respect to the dorsal part of the first air vehicle and wherein the second end comprises a second connection arrangement configured for being reversibly affixed with respect to the lower belly part of the second air vehicle;
wherein the first end comprises a first edge, and the first connection arrangement comprises a plurality of outwardly projecting first brackets configured for reversibly affixing the at least one connector element to a dorsal fuselage surface of the first air vehicle; or wherein the second end comprises a second edge, and the second connection arrangement comprises a plurality of outwardly projecting second brackets configured for reversibly affixing the at least one connector element to a lower belly fuselage surface of the second air vehicle.

11. The composite air vehicle system according to claim 10, including one of the following:

wherein the at least one connector element is in the form of an aerodynamically contoured spacer body;

wherein the at least one connector element is in the form of an aerodynamically contoured spacer body, and, wherein the at least one connector element is in the form of an aerodynamic vertical fin when the composite air vehicle is in straight and level flight, having an aerofoil-like cross-section, a leading edge and a trailing edge; or wherein the at least one connector element is in the form of an aerodynamically contoured spacer body, and, wherein the at least one connector element has a swept-back aerodynamic configuration, which facilitates providing a required longitudinal spacing and height spacing between the first air vehicle and the second air vehicle in the composite air vehicle.

12. A method of operating the composite air vehicle system of claim 1, the method comprising:

(a) providing a composite air vehicle, assembled from the composite air vehicle system, the composite air vehicle comprising said first air vehicle interconnected to said second air vehicle via said connector element;

(b) operating the composite air vehicle to carry out a mission having mission parameters;

(c) disengaging the first air vehicle with respect to the second air vehicle, and operating each one of said first air vehicle and said second air vehicle independently from one another, and, wherein after said disengagement said connector element remains connected to only one of said first air vehicle and said second air vehicle.

13. A method of providing a composite air vehicle system, the method comprising:

providing a composite air vehicle system, the composite air vehicle system being as defined in claim 1;

interconnecting the first air vehicle with the second air vehicle in tandem arrangement via the connector element to provide the composite air vehicle.

14. A method of operating a composite air vehicle system, the composite air vehicle system being as defined in claim 1, the method comprising:

(a) providing a composite air vehicle, assembled from the composite air vehicle system, the composite air vehicle comprising one said first air vehicle interconnected to one said second air vehicle via a said connector element;

(b) operating the composite air vehicle to carry out a mission having mission parameters.

15. The method according to claim 14, further comprising:

disengaging the first air vehicle with respect to the second air vehicle, and operating each one of said first air vehicle and said second air vehicle independently from one another.

16. The method according to claim 14, including one of the following:

wherein prior to step (a) said mission parameters are compared with performance characteristics of said first air vehicle and with performance characteristics of said second air vehicle;

wherein prior to step (a) said mission parameters are compared with performance characteristics of said first air vehicle and with performance characteristics of said second air vehicle, and, wherein if it is determined that said mission parameters can be accomplished using a single one of said first air vehicle and said second air vehicle, then steps (a) and (b) are replaced with the step of preparing and dispatching the respective one of said first air vehicle and said second air vehicle for the mission;

wherein prior to step (a) said mission parameters are compared with performance characteristics of said first air vehicle and with performance characteristics of said second air vehicle, and, wherein if it is determined that said mission parameters cannot be accomplished using a single one of said first air vehicle and said second air vehicle, then said mission parameters are compared with performance characteristics of a composite air vehicle assembled from said first air vehicle and said second air vehicle; or wherein prior to step (a) said mission parameters are compared with performance characteristics of said first air vehicle and with performance characteristics of said second air vehicle, and, wherein if it is determined that said mission parameters cannot be accomplished using a single one of said first air vehicle and said second air vehicle, then said mission parameters are compared with performance characteristics of a composite air vehicle assembled from said first air vehicle and said second air vehicle, and, wherein if it is determined that said mission parameters can be accomplished using said composite air vehicle, then the method proceeds with steps (a) and (b).

17. A composite air vehicle, comprising:

a first air vehicle;

a second air vehicle; and a connector;

wherein said first air vehicle, said second air vehicle, and said connector element are provided by a composite air vehicle system including:

the first air vehicle capable of independent aerodynamic flight;

the second air vehicle capable of independent aerodynamic flight; and the connector element configured for reversibly interconnecting the first air vehicle and the second air vehicle in tandem arrangement to provide the composite air vehicle capable of aerodynamic flight, wherein said connector element comprises a connector strut having a first end and a second end spaced from one another, and wherein the first end is configured for being reversibly affixed with respect to a dorsal part of the first air vehicle and wherein the second end is configured for being reversibly affixed with respect to a lower belly part of the second air vehicle;

wherein the composite air vehicle system is configured for enabling at least in-flight separation of the composite air vehicle into said first air vehicle and second air vehicle, and for enabling each one of said first air vehicle and said second air vehicle to operate independently of one another;

wherein, in the composite air vehicle, the first air vehicle and the second air vehicle are interconnected together in said tandem arrangement via said connector element; and wherein the first air vehicle and the second air vehicle are each configured to generate aerodynamic lift at least in straight and level flight at least when interconnected to provide the composite air vehicle, to thereby provide aerodynamic lift to the composite air vehicle sufficient to thereby enable said aerodynamic flight of the composite air vehicle.

18. A connector element for a composite air vehicle system, the connector element configured for reversibly interconnecting in tandem arrangement a first air vehicle and a second air vehicle to provide a composite air vehicle capable of aerodynamic flight, the connector element being configured for enabling at least in-flight separation of the composite air vehicle into the first air vehicle and the second air vehicle, to thereby enable each one of the first air vehicle and the second air vehicle to operate independently of one another, wherein said connector element comprises a connector strut having a first end and a second end spaced from one another, and wherein the first end is configured for being reversibly affixed with respect to a dorsal part of the first air vehicle and wherein the second end is configured for being reversibly affixed with respect to a lower belly part of the second air vehicle.

19. The connector element according to claim 18, including at least one of the following:

wherein the first end comprises a first connection arrangement configured for being reversibly affixed with respect to the dorsal part of the first air vehicle and wherein the second end comprises a second connection arrangement configured for being reversibly affixed with respect to the lower belly part of the second air vehicle;

wherein the first end comprises a first edge, and the first connection arrangement comprises a plurality of outwardly projecting first brackets configured for reversibly affixing the connector element to an upper fuselage surface of the first air vehicle; or wherein the second end comprises a second edge, and the second connection arrangement comprises a plurality of outwardly projecting second brackets configured for reversibly affixing the connector element to a lower fuselage surface of the second air vehicle.

20. The connector element according to claim 18, including one of the following:

wherein the connector element is in the form of an aerodynamically contoured spacer body configured for generating zero net lift when the composite air vehicle is in straight and level flight;

the connector element is in the form of an aerodynamic vertical fin when the composite air vehicle is in straight and level flight, and having an aerofoil-like cross-section, a leading edge and a trailing edge;

wherein the connector element is in the form of an aerodynamically contoured spacer body, and, wherein the connector element has a swept-back aerodynamic configuration, which facilitates providing a required longitudinal spacing and height spacing between the first air vehicle and the second air vehicle in the composite air vehicle when the composite air vehicle is in straight and level flight; or the connector element is in the form of an aerodynamic vertical fin when the composite air vehicle is in straight and level flight, having an aerofoil-like cross-section, a leading edge and a trailing edge, and, wherein the connector element has a swept-back aerodynamic configuration, which facilitates providing a required longitudinal spacing and height spacing between the first air vehicle and the second air vehicle in the composite air vehicle when the composite air vehicle is in straight and level flight.

21. The connector element according to claim 18, wherein the connector element is configured as an elongate body extending in an elongate direction between a first end configured for being reversibly affixed with respect to the first air vehicle and a second end configured for being reversibly affixed with respect to the second air vehicle, when reversibly interconnected in said tandem arrangement to provide the composite air vehicle, and wherein said elongate direction is a vertical direction when the composite air vehicle is in straight and level flight.

22. The connector element according to claim 18, wherein the connector element is configured for interconnecting the first air vehicle and the second air vehicle in a tandem arrangement such that said second air vehicle is positioned aft spaced with respect to the first air vehicle.

23. The connector element according to claim 22, wherein the connector element is further configured for interconnecting the first air vehicle and the second air vehicle in said tandem arrangement such that said second air vehicle is also positioned upwardly spaced with respect to the first air vehicle when the composite air vehicle is in straight and level flight, or wherein the connector element is further configured for interconnecting the first air vehicle and the second air vehicle in said tandem arrangement such that said first air vehicle is also positioned upwardly spaced with respect to the second air vehicle when the composite air vehicle is in straight and level flight.

24. A composite air vehicle system, comprising:
a first air vehicle capable of independent aerodynamic flight;
a second air vehicle capable of independent aerodynamic flight; and
at least one connector element configured for reversibly interconnecting the first air vehicle and the second air vehicle in tandem arrangement to provide a composite air vehicle capable of aerodynamic flight;
wherein the composite air vehicle system is configured for enabling at least in-flight separation of the composite air vehicle into said first air vehicle and second air vehicle, and for enabling each one of said first air vehicle and said second air vehicle to operate independently of one another, wherein after said separation said connector element remains connected to only one of said first air vehicle and said second air vehicle; and
wherein the first air vehicle and the second air vehicle are each configured to generate aerodynamic lift at least in straight and level flight at least when interconnected to provide the composite air vehicle, to thereby provide aerodynamic lift to the composite air vehicle sufficient to thereby enable said aerodynamic flight of the composite air vehicle.

* * * * *